United States Patent
Xue et al.

(10) Patent No.: US 12,245,296 B2
(45) Date of Patent: Mar. 4, 2025

(54) COMMUNICATION METHOD AND APPARATUS

(71) Applicant: Huawei Technologies Co., Ltd., Shenzhen (CN)

(72) Inventors: Lixia Xue, Beijing (CN); Xu Zhang, Beijing (CN); Feng Wang, Beijing (CN); Di Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 17/853,269

(22) Filed: Jun. 29, 2022

(65) Prior Publication Data
US 2022/0338275 A1  Oct. 20, 2022

Related U.S. Application Data

(63) Continuation of application No. PCT/CN2019/130946, filed on Dec. 31, 2019.

(51) Int. Cl.
*H04W 4/00* (2018.01)
*H04W 56/00* (2009.01)
(Continued)

(52) U.S. Cl.
CPC ..... *H04W 74/0841* (2013.01); *H04W 56/001* (2013.01); *H04W 72/0446* (2013.01);
(Continued)

(58) Field of Classification Search
None
See application file for complete search history.

(56) References Cited

U.S. PATENT DOCUMENTS

2019/0104552 A1    4/2019  Hui et al.
2019/0110242 A1*   4/2019  Islam ............... H04J 11/0069
(Continued)

FOREIGN PATENT DOCUMENTS

CN    110546981 A    12/2019
CN    110546990 A    12/2019
CN    110603793 A    12/2019

OTHER PUBLICATIONS

"On Initial Access, RRM, Mobility and RLM," Agenda Item: 7.2.2.4.2, Source: Ericsson, Document for: Discussion, Decision, 3GPP TSG-RAN WG1 Meeting #95, R1-1813459, Spokane, USA, Nov. 12-16, 2018, 15 pages.
(Continued)

*Primary Examiner* — Zewdu A Beyen
(74) *Attorney, Agent, or Firm* — Slater Matsil, LLP

(57) ABSTRACT

A communication method and device is provided where a network device can learn of a synchronization signal/physical broadcast channel block selected by a terminal device. The method includes receiving, from a network device, a first synchronization signal/physical broadcast channel block located at a first frequency domain position, and receiving, from the network device, a second synchronization signal/physical broadcast channel block located at a second frequency domain position, determining random access channel occasions corresponding to the second frequency domain position, determining, in the random access channel occasions corresponding to the second frequency domain position and based on a sending status of a synchronization signal/physical broadcast channel block located at the second frequency domain position, a random access channel occasion to which the second synchronization signal/physical broadcast channel block is mapped, and performing random access on the random access channel occa-
(Continued)

sion to which the second synchronization signal/physical broadcast channel block is mapped.

19 Claims, 11 Drawing Sheets

(51) Int. Cl.
*H04W 72/0446* (2023.01)
*H04W 72/0453* (2023.01)
*H04W 72/1263* (2023.01)
*H04W 74/08* (2009.01)
*H04W 74/0833* (2024.01)

(52) U.S. Cl.
CPC ... *H04W 72/0453* (2013.01); *H04W 72/1263* (2013.01); *H04W 74/0866* (2013.01)

(56) References Cited

U.S. PATENT DOCUMENTS

| 2019/0268947 A1 | 8/2019 | Zhang et al. |
| 2019/0387546 A1 | 12/2019 | Li et al. |
| 2020/0059970 A1* | 2/2020 | Islam ................. H04W 56/005 |

OTHER PUBLICATIONS

ITL, "Initial access and mobility for NR-U", 3GPP TSG-RAN WG1 Meeting #94bis R1-1811443, Oct. 8-12, 2018, 4 pages, Chengdu, China.

* cited by examiner

COMMUNICATION METHOD AND APPARATUS

CROSS-REFERENCE TO RELATED APPLICATIONS

This application is a continuation of International Application No. PCT/CN2019/130946, filed on Dec. 31, 2019, the disclosure of which is hereby incorporated by reference in its entirety.

TECHNICAL FIELD

This application relates to the field of mobile communication technologies, and in particular, to a communication method and apparatus.

BACKGROUND

In an existing solution, all synchronization signal/physical broadcast channel blocks in one synchronization signal/physical broadcast channel set are sent at one frequency domain position. To reduce power consumption of a network device, synchronization signal/physical broadcast channel block frequency division multiplexing may be applied. To be specific, synchronization signal/physical broadcast channel blocks in one synchronization signal/physical broadcast channel set may be located at a plurality of frequency domain positions.

When performing random access, a terminal device selects a synchronization signal/physical broadcast channel block, and performs random access on a random access channel occasion to which the synchronization signal/physical broadcast channel block is mapped. When synchronization signal/physical broadcast channel block frequency division multiplexing is applied, if an existing manner of mapping a synchronization signal/physical broadcast channel block to a random access channel occasion is still used, the network device may not learn of the synchronization signal/physical broadcast channel block selected by the terminal device.

SUMMARY

Embodiments of this application provide a communication method, apparatus, and device, so that when synchronization signal/physical broadcast channel block frequency division multiplexing is applied, a network device can learn of a synchronization signal/physical broadcast channel block selected by a terminal device.

According to a first aspect, a first communication method is provided. The method includes receiving a first synchronization signal/physical broadcast channel block located at a first frequency domain position, receiving a second synchronization signal/physical broadcast channel block located at a second frequency domain position, determining random access channel RACH occasions corresponding to the second frequency domain position, determining, in the RACH occasions corresponding to the second frequency domain position and based on a sending status of a synchronization signal/physical broadcast channel block located at the second frequency domain position, a RACH occasion to which the second synchronization signal/physical broadcast channel block is mapped, and performing random access on the RACH occasion to which the second synchronization signal/physical broadcast channel block is mapped.

The method may be performed by a first communication apparatus. The first communication apparatus may be a terminal device, a chip that is disposed in the terminal device and that is configured to implement a function of the terminal device, or another component that is configured to implement the function of the terminal device.

According to the method, when synchronization signal/physical broadcast channel block frequency division multiplexing is applied, a network device can learn of a synchronization signal/physical broadcast channel block selected by the terminal device.

In an optional implementation, the method further includes receiving a system information block type 1 SIB 1 corresponding to the first synchronization signal/physical broadcast channel block, where the SIB 1 includes indication information of RACH occasions corresponding to the first frequency domain position, and the determining RACH occasions corresponding to the second frequency domain position includes determining, based on the indication information of the RACH occasions corresponding to the first frequency domain position, the RACH occasions corresponding to the second frequency domain position.

In this manner, even if the terminal device switches to a new frequency domain position to perform random access, the terminal device does not need to repeatedly receive the SIB 1. This shortens a delay of switching a frequency domain position by the terminal device, accelerates a random access speed of the terminal device, and reduces energy consumption of the terminal device.

In an optional implementation, the determining, based on the indication information of the RACH occasions corresponding to the first frequency domain position, the RACH occasions corresponding to the second frequency domain position includes determining, based on the indication information of the RACH occasions corresponding to the first frequency domain position, an index of the first synchronization signal/physical broadcast channel block, and an index of the second synchronization signal/physical broadcast channel block, the RACH occasions corresponding to the second frequency domain position.

In an optional implementation, the index of the first synchronization signal/physical broadcast channel block is an index of the first synchronization signal/physical broadcast channel block in consideration of only a frequency domain sequence, and the index of the second synchronization signal/physical broadcast channel block is an index of the second synchronization signal/physical broadcast channel block in consideration of only a frequency domain sequence, or the index of the first synchronization signal/physical broadcast channel block is an index the first synchronization signal/physical broadcast channel block in consideration of a frequency domain sequence and a time domain sequence, and the index of the second synchronization signal/physical broadcast channel block is an index of the second synchronization signal/physical broadcast channel block in consideration of a frequency domain sequence and a time domain sequence.

In an optional implementation, the index of the first synchronization signal/physical broadcast channel block and the index of the second synchronization signal/physical broadcast channel block are included in the SIB 1, or the index of the first synchronization signal/physical broadcast channel block is included in the first synchronization signal/physical broadcast channel block, and the index of the second synchronization signal/physical broadcast channel block is included in the second synchronization signal/physical broadcast channel block.

In an optional implementation, the method further includes receiving a system information block type 1 SIB 1 corresponding to the first synchronization signal/physical broadcast channel block, where the SIB 1 includes indication information of RACH occasions corresponding to the first frequency domain position, where indication information of the RACH occasions corresponding to the second frequency domain position is included in at least one of the SIB 1 and the second synchronization signal/physical broadcast channel block, and the determining RACH occasions corresponding to the second frequency domain position includes determining, based on the indication information of the RACH occasions corresponding to the second frequency domain position, the RACH occasions corresponding to the second frequency domain position.

In this manner, likewise, even if the terminal device switches to a new frequency domain position to perform random access, the terminal device does not need to repeatedly receive the SIB 1. This shortens a delay of switching a frequency domain position by the terminal device, accelerates a random access speed of the terminal device, and reduces energy consumption of the terminal device.

In an optional implementation, the sending status of the synchronization signal/physical broadcast channel block at the second frequency domain position is included in the SIB 1.

In an optional implementation, the method further includes receiving a system information block type 1 SIB 1 corresponding to the first synchronization signal/physical broadcast channel block, where the SIB 1 includes indication information of RACH occasions corresponding to the first frequency domain position, determining, based on the indication information of the RACH occasions corresponding to the first frequency domain position, the RACH occasions corresponding to the first frequency domain position, determining, in the RACH occasions corresponding to the first frequency domain position and based on a sending status of a synchronization signal/physical broadcast channel block located at the first frequency domain position, a RACH occasion to which the first synchronization signal/physical broadcast channel block is mapped, performing random access on the RACH occasion to which the first synchronization signal/physical broadcast channel block is mapped, and receive radio resource control RRC signaling or a physical downlink control channel PDCCH, where the RRC signaling or the PDCCH includes indication information of the RACH occasions corresponding to the second frequency domain position, and the determining RACH occasions corresponding to the second frequency domain position includes determining, based on the indication information of the RACH occasions corresponding to the second frequency domain position, the RACH occasions corresponding to the second frequency domain position.

In this manner, likewise, even if the terminal device switches to a new frequency domain position to perform random access, the terminal device does not need to repeatedly receive the SIB 1. This shortens a delay of switching a frequency domain position by the terminal device, accelerates a random access speed of the terminal device, and reduces energy consumption of the terminal device. In addition, impact on a terminal device that does not perform synchronization signal/physical broadcast channel block frequency division multiplexing is reduced.

In an optional implementation, the sending status of the SSB at the second frequency domain position and/or an index of the second synchronization signal/physical broadcast channel block are/is included in the RRC signaling or the PDCCH.

In an optional implementation, the indication information of the ROs corresponding to the second frequency domain position includes at least one of the following: indication information, in all indication information of the ROs corresponding to the second frequency domain position, other than indication information that is the same as the indication information of the ROs corresponding to the first frequency domain position, a frequency domain start position of the ROs corresponding to the second frequency domain position, and a frequency division multiplexing quantity of the ROs corresponding to the second frequency domain position.

In an optional implementation, at least one of the following is satisfied. Time domain positions of the ROs corresponding to the first frequency domain position are the same as time domain positions of the ROs corresponding to the second frequency domain position, the ROs corresponding to the first frequency domain position do not overlap the ROs corresponding to the second frequency domain position, the ROs corresponding to the first frequency domain position and the ROs corresponding to the second frequency domain position are closely arranged in frequency domain and/or time domain, a frequency domain start position of the ROs corresponding to the first frequency domain position is different from the frequency domain start position of the ROs corresponding to the second frequency domain position, and other indication information in the indication information of the ROs corresponding to the first frequency domain position and the indication information of the ROs corresponding to the second frequency domain position is the same through comparison, and a frequency division multiplexing quantity of the ROs corresponding to the first frequency domain position is the same as the frequency division multiplexing quantity of the ROs corresponding to the SSB located at the second frequency domain position.

According to a second aspect, a second communication method is provided. The method includes sending a first synchronization signal/physical broadcast channel block located at a first frequency domain position, sending a second synchronization signal/physical broadcast channel block located at a second frequency domain position, determining, in random access channel RACH occasions corresponding to the first frequency domain position and based on a sending status of a synchronization signal/physical broadcast channel block located at the first frequency domain position, a RACH occasion to which the first synchronization signal/physical broadcast channel block is mapped, and determining, in RACH occasions corresponding to the second frequency domain position and based on a sending status of a synchronization signal/physical broadcast channel block located at the second frequency domain position, a RACH occasion to which the second synchronization signal/physical broadcast channel block is mapped.

The method may be performed by a second communication apparatus. The second communication apparatus may be a network device, a chip that is disposed in the network device and that is configured to implement a function of the network device, or another component that is configured to implement the function of the network device.

In an optional implementation, the first synchronization signal/physical broadcast channel block includes an index of the first synchronization signal/physical broadcast channel block, and the second synchronization signal/physical broadcast channel block includes an index of the second synchronization signal/physical broadcast channel block, or the method further includes sending a system information block type 1 SIB 1 corresponding to the first synchronization signal/physical broadcast channel block, where the SIB 1 includes indication information of the RACH occasions corresponding to the first frequency domain position, an index of the first synchronization signal/physical broadcast channel block, and an index of the second synchronization signal/physical broadcast channel block.

In an optional implementation, the index of the first synchronization signal/physical broadcast channel block is an index of the first synchronization signal/physical broadcast channel block in consideration of only a frequency domain sequence, and the index of the second synchronization signal/physical broadcast channel block is an index of the second synchronization signal/physical broadcast channel block in consideration of only a frequency domain sequence, or the index of the first synchronization signal/physical broadcast channel block is an index the first synchronization signal/physical broadcast channel block in consideration of a frequency domain sequence and a time domain sequence, and the index of the second synchronization signal/physical broadcast channel block is an index of the second synchronization signal/physical broadcast channel block in consideration of a frequency domain sequence and a time domain sequence.

In an optional implementation, the method further includes sending a system information block type 1 SIB 1 corresponding to the first synchronization signal/physical broadcast channel block, where the SIB 1 includes indication information of the RACH occasions corresponding to the first frequency domain position, where indication information of the RACH occasions corresponding to the second frequency domain position is included in at least one of the SIB 1 and the second synchronization signal/physical broadcast channel block.

In an optional implementation, the sending status of the synchronization signal/physical broadcast channel block at the second frequency domain position is included in the SIB 1.

In an optional implementation, the method further includes sending a system information block type 1 SIB 1 corresponding to the first synchronization signal/physical broadcast channel block, where the SIB 1 includes indication information of the RACH occasions corresponding to the first frequency domain position, and when a terminal device performs random access on the RACH occasion to which the first synchronization signal/physical broadcast channel block is mapped, sending radio resource control RRC signaling or a physical downlink control channel PDCCH to the terminal device, where the RRC signaling or the PDCCH includes indication information of the RACH occasions corresponding to the second frequency domain position.

In an optional implementation, the sending status of the SSB at the second frequency domain position and/or an index of the second synchronization signal/physical broadcast channel block are/is included in the RRC signaling or the PDCCH.

In an optional implementation, the indication information of the ROs corresponding to the second frequency domain position includes at least one of the following: indication information, in all indication information of the ROs corresponding to the second frequency domain position, other than indication information that is the same as the indication information of the ROs corresponding to the first frequency domain position, a frequency domain start position of the ROs corresponding to the second frequency domain position, and a frequency division multiplexing quantity of the ROs corresponding to the second frequency domain position.

In an optional implementation, at least one of the following is satisfied. Time domain positions of the ROs corresponding to the first frequency domain position are the same as time domain positions of the ROs corresponding to the second frequency domain position, the ROs corresponding to the first frequency domain position do not overlap the ROs corresponding to the second frequency domain position, the ROs corresponding to the first frequency domain position and the ROs corresponding to the second frequency domain position are closely arranged in frequency domain and/or time domain, a frequency domain start position of the ROs corresponding to the first frequency domain position is different from the frequency domain start position of the ROs corresponding to the second frequency domain position, and other indication information in the indication information of the ROs corresponding to the first frequency domain position and the indication information of the ROs corresponding to the second frequency domain position is the same through comparison, and a frequency division multiplexing quantity of the ROs corresponding to the first frequency domain position is the same as the frequency division multiplexing quantity of the ROs corresponding to the SSB located at the second frequency domain position.

For technical effects of the second aspect or the implementations, refer to the descriptions of the technical effects of the first aspect or the corresponding implementations.

According to a third aspect, a communication apparatus is provided. The communication apparatus may be the foregoing first communication apparatus. The communication apparatus is configured to perform the method according to any one of the first aspect or the possible implementations. The communication apparatus may be a terminal device, or a chip or another component disposed in the terminal device. Specifically, the communication apparatus may include a module configured to perform the method according to any one of the first aspect or the possible implementations, for example, include a processing module and a transceiver module. The transceiver module may alternatively be implemented by using a transceiver, and the processing module may alternatively be implemented by using a processor. If the communication apparatus is a terminal device, the transceiver may be implemented by using an antenna, a feeder, a codec, and the like in the terminal device. Alternatively, if the communication apparatus is a chip disposed in the terminal device, the transceiver may be a communication interface in the chip, and the communication interface is connected to a radio frequency transceiver component in the terminal device, to implement information sending and receiving by using the radio frequency transceiver component.

According to a fourth aspect, a communication apparatus is provided. The communication apparatus may be the foregoing second communication apparatus. The communication apparatus is configured to perform the method according to any one of the second aspect or the possible implementations. The communication apparatus may be a network device, or a chip or another component disposed in the network device. Specifically, the communication apparatus may include a module configured to perform the method according to any one of the second aspect or the possible implementations, for example, include a processing module and a transceiver module. The transceiver module may alternatively be implemented by using a transceiver, and the processing module may alternatively be implemented by using a processor. If the communication apparatus is a network device, the transceiver may be implemented by using an antenna, a feeder, a codec, and the like in the network device. Alternatively, if the communication apparatus is a chip disposed in the network device, the transceiver may be a communication interface in the chip, and the communication interface is connected to a radio frequency transceiver component in the network device, to implement information sending and receiving by using the radio frequency transceiver component.

According to a fifth aspect, a communication apparatus is provided. The communication apparatus may be the foregoing first communication apparatus. The communication apparatus includes a processor. Optionally, the communication apparatus may further include a memory, configured to store computer instructions. The processor and the memory are coupled to each other, and are configured to implement the method according to the first aspect or the possible implementations. Alternatively, the communication apparatus may not include a memory, and the memory may be located outside the communication apparatus. Optionally, the communication apparatus may further include a communication interface, configured to communicate with another apparatus or device. The processor, the memory, and the communication interface are coupled to each other, and are configured to implement the method according to the first aspect or the possible implementations. For example, when the processor executes the computer instructions stored in the memory, the communication apparatus is enabled to perform the method according to any one of the first aspect or the possible implementations. The communication apparatus may be a terminal device, or a chip or another component disposed in the terminal device. If the communication apparatus is a terminal device, a transceiver may be implemented by using an antenna, a feeder, a codec, and the like in the terminal device. Alternatively, if the communication apparatus is a chip disposed in the terminal device, a transceiver may be a communication interface in the chip, and the communication interface is connected to a radio frequency transceiver component in the terminal device, to implement information sending and receiving by using the radio frequency transceiver component.

According to a sixth aspect, a communication apparatus is provided. The communication apparatus may be the foregoing second communication apparatus. The communication apparatus includes a processor. Optionally, the communication apparatus may further include a memory, configured to store computer instructions. The processor and the memory are coupled to each other, and are configured to implement the method according to the second aspect or the possible implementations. Alternatively, the communication apparatus may not include a memory, and the memory may be located outside the communication apparatus. Optionally, the communication apparatus may further include a communication interface, configured to communicate with another apparatus or device. The processor, the memory, and the communication interface are coupled to each other, and are configured to implement the method according to the second aspect or the possible implementations. For example, when the processor executes the computer instructions stored in the memory, the communication apparatus is enabled to perform the method according to any one of the second aspect or the possible implementations. The communication apparatus may be a network device, or a chip or another component disposed in the network device. If the communication apparatus is a network device, a transceiver may be implemented by using an antenna, a feeder, a codec, and the like in the network device. Alternatively, if the communication apparatus is a chip disposed in the network device, a transceiver may be a communication interface in the chip, and the communication interface is connected to a radio frequency transceiver component in the network device, to implement information sending and receiving by using the radio frequency transceiver component.

According to a seventh aspect, a communication system is provided. The communication system includes the communication apparatus according to the third aspect or the communication apparatus according to the fifth aspect, and includes the communication apparatus according to the fourth aspect or the communication apparatus according to the sixth aspect.

According to an eighth aspect, a computer-readable storage medium is provided. The computer-readable storage medium is configured to store computer instructions. When the computer instructions are run on a computer, the computer is enabled to perform the method according to any one of the first aspect or the possible implementations.

According to a ninth aspect, a computer-readable storage medium is provided. The computer-readable storage medium is configured to store computer instructions. When the computer instructions are run on a computer, the computer is enabled to perform the method according to any one of the second aspect or the possible implementations.

According to a tenth aspect, a computer program product including instructions is provided. The computer program product is configured to store computer instructions. When the computer instructions are run on a computer, the computer is enabled to perform the method according to any one of the first aspect or the possible implementations.

According to an eleventh aspect, a computer program product including instructions is provided. The computer program product is configured to store computer instructions. When the computer instructions are run on a computer, the computer is enabled to perform the method according to any one of the second aspect or the possible implementations.

DETAILED DESCRIPTION OF ILLUSTRATIVE EMBODIMENTS

Figure 1A:
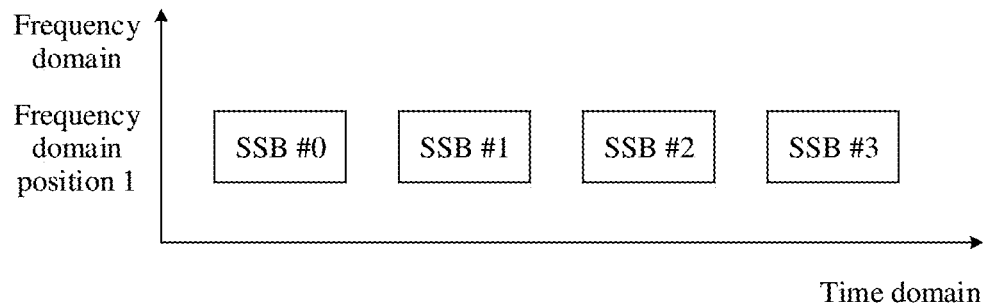
FIG. 1A is a schematic diagram of time domain positions and a frequency domain position that are of synchronization signal/physical broadcast channel blocks and that correspond when synchronization signal/physical broadcast channel block frequency division multiplexing is not applied.

To make objectives, technical solutions, and advantages of embodiments of this application clearer, the following further describes embodiments of this application in detail with reference to accompanying drawings.

In the following descriptions, some terms in embodiments of this application are explained and described, to help a person skilled in the art have a better understanding.

A terminal device includes a device that provides a voice and/or data connectivity for a user. Specifically, the terminal device includes a device that provides the voice for the user, includes a device that provides the data connectivity for the user, or includes a device that provides the voice and the data connectivity for the user. For example, the terminal device may include a handheld device having a wireless connection function or a processing device connected to the wireless modem. The terminal device may communicate with a core network through a radio access network (RAN), and exchange a voice or data with the RAN, or exchange the voice and the data with the RAN. The terminal device may include user equipment (UE), a wireless terminal device, a mobile terminal device, a device-to-device (D2D) communication terminal device, a vehicle to everything (V2X) terminal device, a machine-to-machine/machine type communication (M2M/MTC) terminal device, an internet of things (IoT) terminal device, a subscriber unit, a subscriber station, a mobile station, a remote station, an access point (acAP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus, for example, a device such as a personal communications service (PCS) phone, a cordless telephone set, a session initiation protocol (SIP) phone, a wireless local loop (WLL) station, or a personal digital assistant (PDA). The terminal device further includes a limited device, for example, a device with low power consumption, a device with a limited storage capacity, or a device with a limited computing capability. For example, the terminal apparatus includes an information sensing device such as a barcode, radio frequency identification (RFID), a sensor, a global positioning system (GPS), or a laser scanner.

By way of example but not limitation, in embodiments of this application, the terminal device may alternatively be a wearable device. The wearable device may also be referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is directly worn, or is a portable device integrated into clothes or an accessory of the user. The wearable device is not only a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus only on a type of application function and need to work with other devices such as smartphones, for example, various smart bands, smart helmets, or smart jewelry for monitoring physical signs.

If the various terminal devices described above are located in a vehicle (for example, placed in the vehicle or installed in the vehicle), the terminal devices may be all considered as vehicle-mounted terminal devices. For example, the vehicle-mounted terminal devices are also referred to as on board units (OBU).

In embodiments of this application, it may also be understood as that all devices that can perform data communication with a base station may be considered as terminal devices.

A network device includes, for example, an access network (AN) device such as a base station (for example, an access point), and may be a device that communicates with a wireless terminal device over an air interface through one or more cells in an access network. Alternatively, for example, a network device in a V2X technology is a road side unit (RSU). The base station may be configured to perform mutual conversion between a received over-the-air frame and an IP packet, and serve as a router between the terminal device and a remaining part of the access network, where the remaining part of the access network may include an IP network. The RSU may be a fixed infrastructure entity supporting a V2X application, and may exchange messages with another entity supporting the V2X application. The network device may further coordinate attribute management of the air interface. For example, the network device may include an evolved NodeB (NodeB or eNB or eNodeB) in a long term evolution (LTE) system or a long term evolution-advanced (LTE-A) system, may include a next generation NodeB (gNB) in a 5th generation (5G) new radio (NR) system (which is also referred to as an NR system for short), or may include a centralized unit (CU) and a distributed unit (DU) in a cloud radio access network (cloud RAN) system.

A synchronization signal/physical broadcast channel block may be a synchronization signal/physical broadcast channel (SS/PBCH) block, or may be referred to as a synchronization signal block (SSB). The SS/PBCH block includes a broadcast channel (BCH) and a synchronization signal. The synchronization signal includes a primary synchronization signal (PSS) and a secondary synchronization signal (SSS).

A random access channel (RACH) occasion is a position at which the terminal device performs random access. Before performing random access, the terminal device first needs to perform cell search to obtain synchronization signal/physical broadcast channel blocks. Next, the terminal device needs to select a synchronization signal/physical broadcast channel block, and perform random access on a RACH occasion corresponding to the synchronization signal/physical broadcast channel block. In this way, the network device can learn of the synchronization signal/physical broadcast channel block selected by the terminal device. Such a correspondence between a synchronization signal/ physical broadcast channel block and a RACH occasion may be referred to as that the synchronization signal/physical broadcast channel block is mapped to the RACH occasion. A master information block (MIB) is broadcast on the BCH in the synchronization signal/physical broadcast channel block. Therefore, the MIB corresponding to the synchronization signal/physical broadcast channel block may be obtained as long as the synchronization signal/physical broadcast channel block is obtained. A parameter about a physical downlink control channel (PDCCH) for scheduling a system information block type 1 (SIB 1) is configured in the MIB. To determine the RACH occasion to which the synchronization signal/physical broadcast channel block is mapped, the terminal device needs to monitor the PDCCH for scheduling the SIB 1, to obtain the SIB 1. Parameters about all RACH occasions to which the synchronization signal/physical broadcast channel block may be mapped are configured in the SIB 1. The terminal device needs to determine, in the RACH occasions, a RACH occasion to which the synchronization signal/physical broadcast channel block is actually mapped. A mapping principle is that the synchronization signal/physical broadcast channel block needs to be mapped to consecutive valid RACH occasions.

Terms "system" and "network" may be used interchangeably in embodiments of this application. "At least one" means one or more, and "a plurality of" means two or more. The term "and/or" describes an association relationship between associated objects, and represents that three relationships may exist. For example, A and/or B may represent the following three cases: Only A exists, both A and B exist, and only B exists. A and B may be singular or plural. The character "/" generally indicates an "or" relationship between the associated objects, but may also indicate an "and" relationship between the associated objects. The description in this application or understanding of a person skilled in the art is used. "At least one of the following" or a similar expression thereof means any combination of these items, and includes a singular item or any combination of plural items. For example, at least one of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit a sequence, a time sequence, priorities, or importance of the plurality of objects. For example, first signaling and second signaling are merely used to distinguish between different signaling, and do not indicate different content, different sending sequences, different priorities, different importance degrees, or the like of the two pieces of signaling.

The foregoing describes concepts of some terms in embodiments of this application. The following describes technical features in embodiments of this application.

In an existing solution, a maximum quantity of synchronization signal/physical broadcast channel blocks that can be sent in a 5-millisecond half-frame is a fixed value (for example, 4, 8, or 64), and resources of optional RACH occasions of the synchronization signal/physical broadcast channel blocks are the same. The terminal device and the network device determine, based on actual sending statuses of the synchronization signal/physical broadcast channel blocks, a RACH occasion to which the synchronization signal/physical broadcast channel blocks are actually mapped. For brevity, a set of the synchronization signal/ physical broadcast channel blocks is referred to as a synchronization signal/physical broadcast channel set below. In other words, the synchronization signal/physical broadcast channel blocks belong to a same synchronization signal/ physical broadcast channel set. It should be understood that a synchronization signal/physical broadcast channel set in the following descriptions is not necessarily limited to the 5-millisecond half-frame. In the existing solution, all synchronization signal/physical broadcast channel blocks in one synchronization signal/physical broadcast channel set are sent at one frequency domain position. For example, as shown in FIG. 1A, four synchronization signal/physical broadcast channel blocks in one synchronization signal/ physical broadcast channel set are sent at a same frequency domain position and four different time domain positions, and the four synchronization signal/physical broadcast channel blocks may be represented as a synchronization signal/ physical broadcast channel block #0, a synchronization signal/physical broadcast channel block #1, a synchronization signal/physical broadcast channel block #2, and a synchronization signal/physical broadcast channel block #3 based on the time domain positions.

Figure 1B:
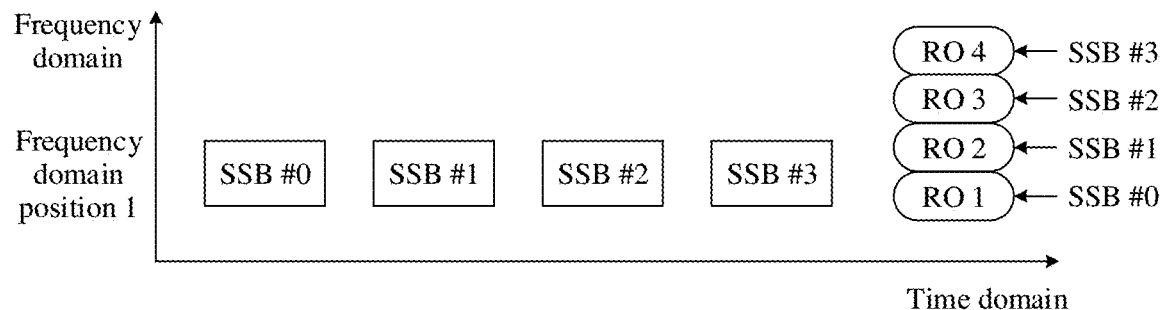
FIG. 1B is a schematic diagram of a mapping relationship that is between synchronization signal/physical broadcast channel blocks and random access channel occasions and that corresponds when synchronization signal/physical broadcast channel block frequency division multiplexing is not applied.

As described above, there is a mapping relationship between a synchronization signal/physical broadcast channel block and a RACH occasion. In the existing solution, synchronization signal/physical broadcast channel blocks in one synchronization signal/physical broadcast channel set are sequentially mapped to consecutive valid RACH occasions based on time domain positions and actual sending statuses of the synchronization signal/physical broadcast channel blocks. For example, it is assumed that one synchronization signal/physical broadcast channel block is mapped to one RACH occasion, and a frequency division multiplexing quantity of RACH occasions is 4. When all four synchronization signal/physical broadcast channel blocks in one synchronization signal/physical broadcast channel set are sent, as shown in FIG. 1B, a synchronization signal/physical broadcast channel block #0 is mapped to a RACH occasion 1, a synchronization signal/physical broadcast channel block #1 is mapped to a RACH occasion 2, a synchronization signal/physical broadcast channel block #2 is mapped to a RACH occasion 3, and a synchronization signal/physical broadcast channel block #3 is mapped to a RACH occasion 4. It can be learned that the RACH occasions to which the actually sent synchronization signal/physical broadcast channel blocks are mapped are consecutive.

Figure 1C:
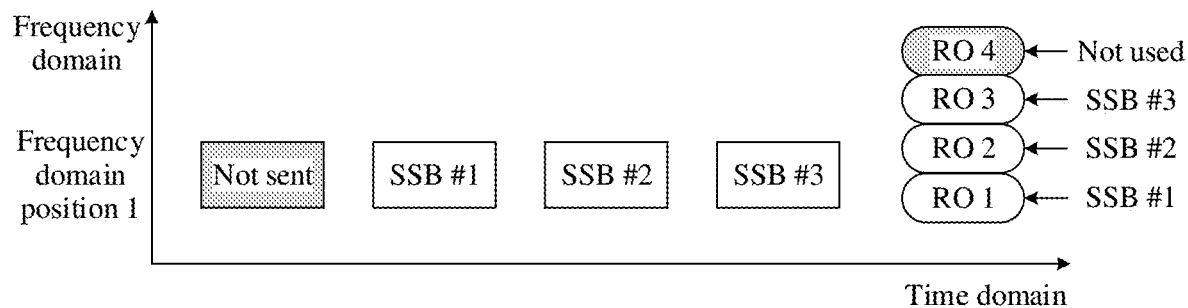
FIG. 1C is another schematic diagram of a mapping relationship that is between synchronization signal/physical broadcast channel blocks and random access channel occasions and that corresponds when synchronization signal/physical broadcast channel block frequency division multiplexing is not applied.

However, not all synchronization signal/physical broadcast channel blocks in one synchronization signal/physical broadcast channel set may be sent. If no synchronization signal/physical broadcast channel block is mapped to a RACH occasion, the RACH occasion is not used for random access. For example, when a synchronization signal/physical broadcast channel block #0 is not sent, the first sent synchronization signal/physical broadcast channel block in the synchronization signal/physical broadcast channel set is a synchronization signal/physical broadcast channel block #1. In this case, as shown in FIG. 1C, the synchronization signal/physical broadcast channel block #1 is mapped to a RACH occasion 1, a synchronization signal/physical broadcast channel block #2 is mapped to a RACH occasion 2, a synchronization signal/physical broadcast channel block #3 is mapped to a RACH occasion 3, and a RACH occasion 4 is not used. It can be learned that, even if there is a synchronization signal/physical broadcast channel block that is not sent, the RACH occasions to which the actually sent synchronization signal/physical broadcast channel blocks are mapped are still consecutive.

Figure 2A:
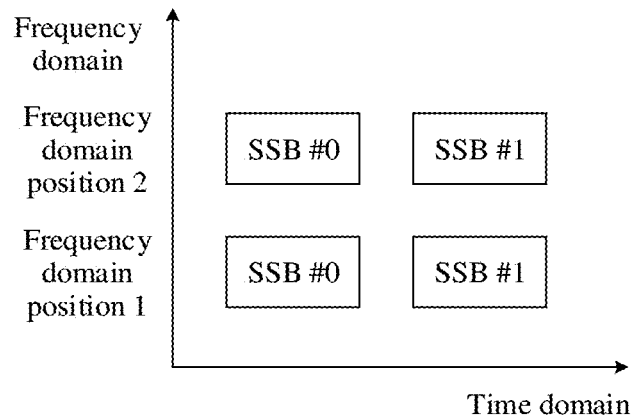
FIG. 2A is a schematic diagram of time domain positions and frequency domain positions that are of synchronization signal/physical broadcast channel blocks and that correspond when synchronization signal/physical broadcast channel block frequency division multiplexing is applied.

If synchronization signal/physical broadcast channel blocks in one synchronization signal/physical broadcast channel set may be sent at a plurality of frequency positions, a quantity of times of sending the synchronization signal/physical broadcast channel blocks in time domain can be reduced, to increase a probability of shutting down the network device, and help save energy of the network device. This manner may be referred to as synchronization signal/physical broadcast channel block frequency division multiplexing (FDM). When synchronization signal/physical broadcast channel block frequency division multiplexing is applied, as shown in FIG. 2A, four synchronization signal/physical broadcast channel blocks in one synchronization signal/physical broadcast channel set are sent at two different frequency domain positions and two different time domain positions, and the four synchronization signal/physical broadcast channel blocks may be represented, based on the frequency domain positions and the time domain positions, as a synchronization signal/physical broadcast channel block #0 located at a frequency domain position 1, a synchronization signal/physical broadcast channel block #0 located at a frequency domain position 2, a synchronization signal/physical broadcast channel block #1 located at the frequency domain position 1, and a synchronization signal/physical broadcast channel block #1 located at the frequency domain position 2.

Figure 2B:
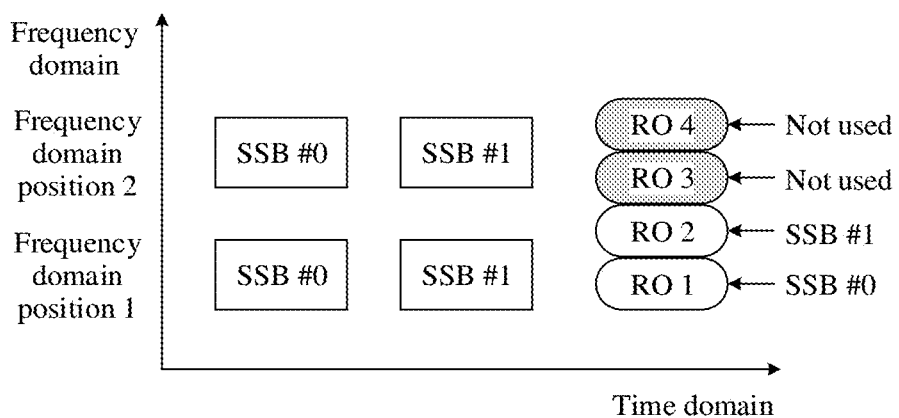
FIG. 2B is still another schematic diagram of a mapping relationship that is between synchronization signal/physical broadcast channel blocks and random access channel occasions and that corresponds when synchronization signal/physical broadcast channel block frequency division multiplexing is applied.

However, when synchronization signal/physical broadcast channel block frequency division multiplexing is applied, if an existing mapping solution is still used, that is, synchronization signal/physical broadcast channel blocks are mapped to consecutive valid RACH occasions based on time domain positions and actual sending statuses of the synchronization signal/physical broadcast channel blocks, when all four synchronization signal/physical broadcast channel blocks in one synchronization signal/physical broadcast channel set are sent, because a time domain position of a synchronization signal/physical broadcast channel block #0 located at a frequency domain position 1 is the same as a time domain position of a synchronization signal/physical broadcast channel block #0 located at a frequency domain position 2, and a time domain position of a synchronization signal/physical broadcast channel block #1 located at the frequency domain position 1 is the same as a time domain position of a synchronization signal/physical broadcast channel block #1 located at the frequency domain position 2, as shown in FIG. 2B, both the synchronization signal/physical broadcast channel block #0 located at the frequency domain position 1 and the synchronization signal/physical broadcast channel block #0 located at the frequency domain position 2 are mapped to a RACH occasion 1, both the synchronization signal/physical broadcast channel block #1 located at the frequency domain position 1 and the synchronization signal/physical broadcast channel block #1 located at the frequency domain position 2 are mapped to a RACH occasion 2, and a RACH occasion 3 and a RACH occasion 4 are not used. If the terminal device performs random access on the RACH occasion 1, the network device cannot distinguish whether a synchronization signal/physical broadcast channel block selected by the terminal device is the synchronization signal/physical broadcast channel block #0 located at the frequency domain position 1 or the synchronization signal/physical broadcast channel block #0 located at the frequency domain position 2.

Figure 2C:
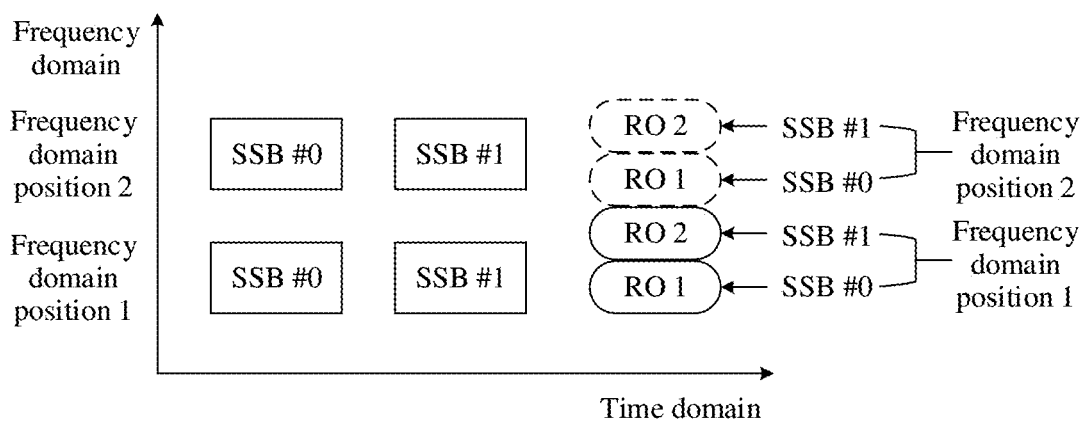
FIG. 2C is a schematic diagram of a mapping relationship that is between synchronization signal/physical broadcast channel blocks and random access channel occasions and that corresponds when synchronization signal/physical broadcast channel block frequency division multiplexing is applied.
Figure 2D:
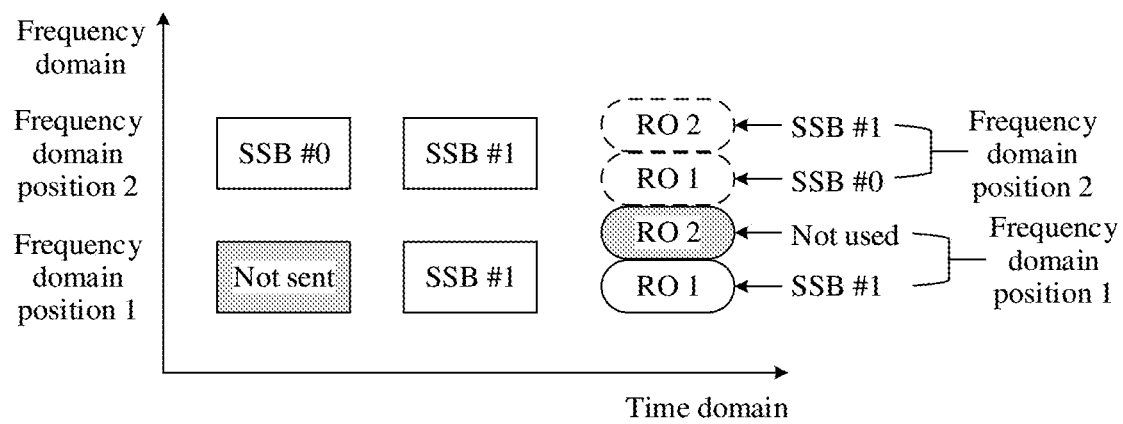
FIG. 2D is another schematic diagram of a mapping relationship that is between synchronization signal/physical broadcast channel blocks and random access channel occasions and that corresponds when synchronization signal/physical broadcast channel block frequency division multiplexing is applied.

To resolve this problem, SIBs 1 corresponding to synchronization signal/physical broadcast channel blocks located at different frequency domain positions may be enabled to indicate different RACH occasions (where RACH occasions indicated by a SIB 1 corresponding to synchronization signal/physical broadcast channel blocks located at a frequency domain position are referred to as RACH occasions corresponding to the frequency domain position below). In this way, independent mapping may be implemented for the synchronization signal/physical broadcast channel blocks located at the different frequency domain positions. To be specific, a synchronization signal/physical broadcast channel block located at a frequency domain position is mapped only to a RACH occasion corresponding to the frequency domain position. For example, when all four synchronization signal/physical broadcast channel blocks in one synchronization signal/physical broadcast channel set are sent, as shown in FIG. 2C, a synchronization signal/physical broadcast channel block #0 and a synchronization signal/physical broadcast channel block #1 that are located at a frequency domain position 1 are respectively mapped to a RACH occasion 1 and a RACH occasion 2 that correspond to the frequency domain position 1, and a synchronization signal/physical broadcast channel block #0 and a synchronization signal/physical broadcast channel block #1 that are located at a frequency domain position 2 are respectively mapped to a RACH occasion 1 and a RACH occasion 2 that correspond to the frequency domain position 2. For another example, when a synchronization signal/physical broadcast channel block #0 located at a frequency domain position 1 is not sent, as shown in FIG. 2D, a synchronization signal/physical broadcast channel block #0 and a synchronization signal/physical broadcast channel block #1 that are located at a frequency domain position 2 are respectively mapped to a RACH occasion 1 and a RACH occasion 2 that correspond to the frequency domain position 2. As the first sent synchronization signal/physical broadcast channel block at the frequency domain position 1, a synchronization signal/physical broadcast channel block #1 located at the frequency domain position 1 is mapped to a RACH occasion 1 corresponding to the frequency domain position 1, and a RACH occasion 2 corresponding to the frequency domain position 1 is not used. It can be learned that, regardless of whether there is a synchronization signal/physical broadcast channel block that is not sent, the RACH occasions to which the actually sent synchronization signal/physical broadcast channel blocks are mapped are consecutive for a single frequency domain position. In this mapping manner, the network device can identify the synchronization signal/physical broadcast channel block selected by the terminal device.

In addition, before performing random access, the terminal device needs to determine whether there is a synchronization signal/physical broadcast channel block whose synchronization signal reference signal received power (SS-RSRP) is greater than a specified threshold. If there is such a synchronization signal/physical broadcast channel block, the terminal device selects the synchronization signal/physical broadcast channel block, and performs random access on a RACH occasion to which the synchronization signal/physical broadcast channel block is mapped. If there is no such a synchronization signal/physical broadcast channel block, the terminal device selects any synchronization signal/physical broadcast channel block, and performs random access on a RACH occasion to which the synchronization signal/physical broadcast channel block is mapped.

In some cases, after selecting a synchronization signal/physical broadcast channel block and obtaining a SIB 1 corresponding to the synchronization signal/physical broadcast channel block, the terminal device may reselect another synchronization signal/physical broadcast channel block that belongs to a same synchronization signal/physical broadcast channel set, to perform random access. For example, when a fast-moving terminal device may have not performed random access, and an SS-RSRP of a synchronization signal/physical broadcast channel block currently selected by the terminal device has changed, the terminal device needs to select a synchronization signal/physical broadcast channel block again. For another example, the terminal device may select, after random access fails, another synchronization signal/physical broadcast channel block to perform random access. As described above, the SIB 1 is used to indicate the RACH occasion to which the synchronization signal/physical broadcast channel block may be mapped.

When all synchronization signal/physical broadcast channel blocks in one synchronization signal/physical broadcast channel set are sent at one frequency domain position, if the terminal device reselects a synchronization signal/physical broadcast channel block, because resources of optional RACH occasions of the newly selected synchronization signal/physical broadcast channel block and a previously selected synchronization signal/physical broadcast channel block are the same, the terminal device may still use a previously obtained SIB 1, and determine, in RACH occasions to which the synchronization signal/physical broadcast channel block may be mapped and that are indicated by the SIB 1, a RACH occasion to which the newly selected synchronization signal/physical broadcast channel block is mapped. That is, the terminal device does not need to obtain again the RACH occasions to which the synchronization signal/physical broadcast channel block may be mapped.

However, when synchronization signal/physical broadcast channel block frequency division multiplexing is applied, if the terminal device reselects a synchronization signal/physical broadcast channel block, and the newly selected synchronization signal/physical broadcast channel block and a previously selected synchronization signal/physical broadcast channel block are located at different frequency domain positions, RACH occasions to which the two synchronization signal/physical broadcast channel blocks may be mapped are different. In this case, the terminal device needs to decode the newly selected synchronization signal/physical broadcast channel block, obtain, from the decoded synchronization signal/physical broadcast channel block, information about a PDCCH for scheduling a SIB 1 corresponding to the synchronization signal/physical broadcast channel block, and obtain the new SIB 1 by monitoring the PDCCH. In this way, RACH occasions to which the newly selected synchronization signal/physical broadcast channel block may be mapped can be obtained from the new SIB 1. In this manner, a delay of switching a frequency domain position by the terminal device is long, a random access speed of the terminal device is affected, and energy consumption of the terminal device is increased.

In view of this, the technical solutions in embodiments of this application are provided. The technical solutions provided in embodiments of this application may be applied to a 4th generation (4G) system, for example, an LTE system, a 5G system, for example, an NR system, or a next-generation mobile communication system or another similar communication system. This is not specifically limited.

Figure 3:
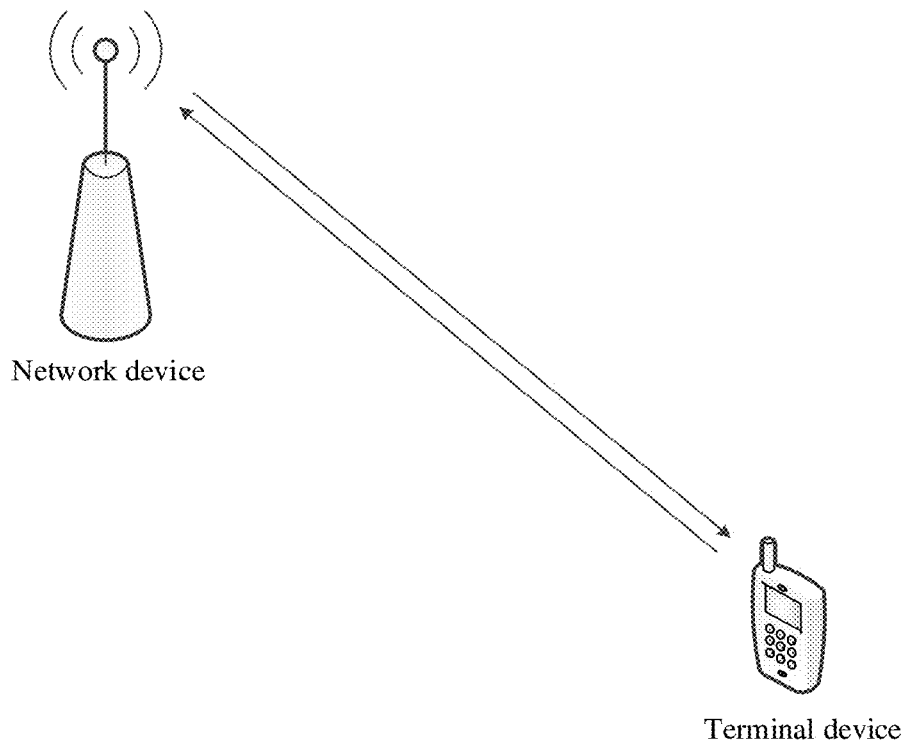
FIG. 3 is a schematic diagram of an application scenario according to an embodiment of this application.

The following describes a network architecture to which embodiments of this application are applied. Refer to FIG. 3.

FIG. 3 includes a network device and a terminal device, and the terminal device is connected to the network device. Certainly, a quantity of terminal devices in FIG. 3 is merely an example. During actual application, the network device may serve a plurality of terminal devices. The network device in FIG. 3 and each of some or all of the plurality of terminal devices may implement the technical solutions provided in embodiments of this application. In addition, a mobile phone is used as an example of the terminal device in FIG. 3. This is not limited during actual application.

The network device in FIG. 3 may be, for example, an access network device, for example, a base station, or may be an RSU or another device. The base station corresponds to different devices in different systems. For example, the base station may correspond to an eNB in a 4G system, and may correspond to a gNB in a 5G system. Certainly, the technical solutions provided in embodiments of this application may alternatively be applied to a future mobile communication system. Therefore, the network device in FIG. 3 may alternatively correspond to an access network device in the future mobile communication system.

The following describes, with reference to the accompanying drawings, the technical solutions provided in embodiments of this application.

Figure 4:
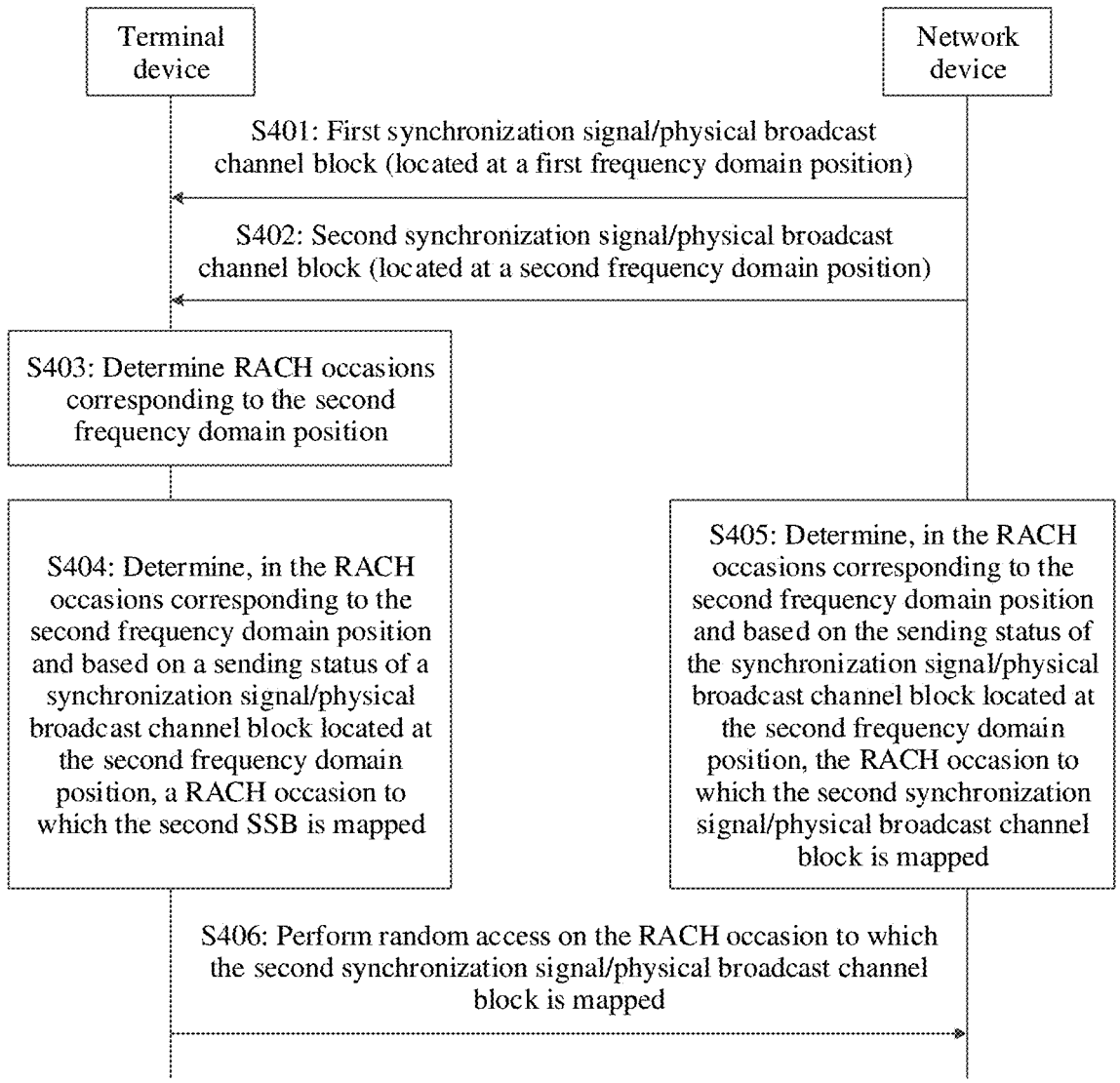
FIG. 4 is a flowchart of a communication method according to an embodiment of this application.

An embodiment of this application provides a communication method. FIG. 4 is a flowchart of the method. The following provides descriptions by using an example in which the method is applied to the network architecture shown in FIG. 3.

S401: The terminal device receives, from the network device, a first synchronization signal/physical broadcast channel block located at a first frequency domain position.

S402: The terminal device receives, from the network device, a second synchronization signal/physical broadcast channel block located at a second frequency domain position.

It should be understood that although S401 is performed before S402 in FIG. 4, a time sequence of the steps is not limited thereto. S401 may be performed after S402, or S401 and S402 may be performed simultaneously.

A frequency domain position may also be referred to as a frequency channel number, and may be represented by using a channel number, for example, a global synchronization channel number (GSCN), for marking a synchronization signal/physical broadcast channel block.

The first synchronization signal/physical broadcast channel block and the second synchronization signal/physical broadcast channel block may belong to a same synchronization signal/physical broadcast channel set. In addition to including the first synchronization signal/physical broadcast channel block and the second synchronization signal/physical broadcast channel block, the synchronization signal/physical broadcast channel set may further include another synchronization signal/physical broadcast channel block located at the first frequency domain position and/or another synchronization signal/physical broadcast channel block located at the second frequency domain position. In addition, the synchronization signal/physical broadcast channel set may further include a synchronization signal/physical broadcast channel block located at another frequency domain position.

For example, in FIG. 2A, the first frequency domain position may be the frequency domain position 1, the second frequency domain position may be the frequency domain position 2, the first synchronization signal/physical broadcast channel block may be the synchronization signal/physical broadcast channel block #1 located at the frequency domain position 1, and the second synchronization signal/physical broadcast channel block may be the synchronization signal/physical broadcast channel block #1 located at the frequency domain position 2.

S403: The terminal device determines RACH occasions corresponding to the second frequency domain position. In this embodiment, there are different manners of determining the RACH occasions corresponding to the second frequency domain position. Details are described below.

As described above, mapping of synchronization signal/physical broadcast channel blocks at different frequency domain positions to RACH occasions is independent of each other. That is, there are RACH occasions corresponding to the first frequency domain position and the RACH occasions corresponding to the second frequency domain position. A synchronization signal/physical broadcast channel block located at the first frequency domain position is mapped only to the RACH occasion corresponding to the first frequency domain position, and a synchronization signal/physical broadcast channel block located at the second frequency domain position is mapped only to the RACH occasion corresponding to the second frequency domain position. For example, in FIG. 2C, RACH occasions corresponding to the frequency domain position 1 are the RACH occasion 1 and the RACH occasion 2 below, and RACH occasions corresponding to the frequency domain position 2 are the RACH occasion 1 and the RACH occasion 2 above.

S404: The terminal device determines, in the RACH occasions corresponding to the second frequency domain position and based on a sending status of the synchronization signal/physical broadcast channel block located at the second frequency domain position, a RACH occasion to which the second synchronization signal/physical broadcast channel block is mapped.

S405: The network device determines, in the RACH occasions corresponding to the second frequency domain position and based on the sending status of the synchronization signal/physical broadcast channel block located at the second frequency domain position, the RACH occasion to which the second synchronization signal/physical broadcast channel block is mapped.

For how to determine, based on the sending status of the synchronization signal/physical broadcast channel block, the RACH occasion to which the synchronization signal/physical broadcast channel block is mapped, refer to the foregoing corresponding descriptions. Details are not described herein again. It should be understood that a mapping relationship between a synchronization signal/physical broadcast channel block and a RACH occasion is not necessarily a one-to-one correspondence. One synchronization signal/physical broadcast channel block may be mapped to a plurality of RACH occasions, or a plurality of synchronization signal/physical broadcast channel blocks may be mapped to one RACH occasion.

The synchronization signal/physical broadcast channel block located at the second frequency domain position may be all synchronization signal/physical broadcast channel blocks located at the second frequency domain position in the synchronization signal/physical broadcast channel set. The sending status of the synchronization signal/physical broadcast channel block refers to whether the synchronization signal/physical broadcast channel block is actually sent. It can be learned from FIG. 2C and FIG. 2D that, when a sending status of a synchronization signal/physical broadcast channel block in a same synchronization signal/physical broadcast channel set varies, a mapping relationship between a sent synchronization signal/physical broadcast channel block and a RACH occasion also varies.

The sending status of the synchronization signal/physical broadcast channel block located at the second frequency domain position may be included in a SIB 1 corresponding to the first synchronization signal/physical broadcast channel block. In addition, the SIB 1 corresponding to the first synchronization signal/physical broadcast channel block may further include a sending status of a synchronization signal/physical broadcast channel block located at another frequency domain position. For example, the SIB 1 corresponding to the first synchronization signal/physical broadcast channel block may include sending statuses of all synchronization signal/physical broadcast channel blocks in the synchronization signal/physical broadcast channel set, or the SIB 1 corresponding to the first synchronization signal/physical broadcast channel block may include the sending status of the synchronization signal/physical broadcast channel block located at a frequency domain position other than the first frequency domain position. To reduce impact on a terminal device that does not perform synchronization signal/physical broadcast channel block frequency division multiplexing, the sending status of the synchronization signal/physical broadcast channel block at the second frequency domain position may be included in a reserved bit of the SIB 1 corresponding to the first synchronization signal/physical broadcast channel block. Alternatively, the SIB 1 may be divided into a first part and a second part. The terminal device that does not perform synchronization signal/physical broadcast channel block frequency division multiplexing decodes only the first part, a terminal device that performs synchronization signal/physical broadcast channel block frequency division multiplexing decodes the first part and the second part, and the sending status of the synchronization signal/physical broadcast channel block at the second frequency domain position may be included in the second part (namely, a part decoded only by the terminal device that performs synchronization signal/physical broadcast channel block frequency division multiplexing).

S406: The terminal device performs random access on the RACH occasion to which the second synchronization signal/physical broadcast channel block is mapped.

It should be understood that although S405 is performed before S406 in FIG. 4, a time sequence of the steps is not limited thereto. S405 may be performed after S406, or S405 and S406 may be performed simultaneously. For example, the network device may first determine mapping relationships between synchronization signal/physical broadcast channel blocks actually sent by the network device and RACH occasions. When the terminal device performs random access on the RACH occasion to which the second synchronization signal/physical broadcast channel block is mapped, a synchronization signal/physical broadcast channel block selected by the terminal device is inferred based on a mapping relationship that is in the mapping relationships and that is of the RACH occasion to which the second synchronization signal/physical broadcast channel block is mapped. Alternatively, the network device may determine, when the terminal device performs random access on the RACH occasion to which the second synchronization signal/physical broadcast channel block is mapped, a specific frequency domain position corresponding to the RACH occasion to which the second synchronization signal/physical broadcast channel block is mapped, then determine mapping relationships between synchronization signal/physical broadcast channel blocks actually sent at the frequency domain position and RACH occasions, and then infer, based on a mapping relationship that is in the mapping relationships and that is of the RACH occasion to which the second synchronization signal/physical broadcast channel block is mapped, a synchronization signal/physical broadcast channel block selected by the terminal device.

In this manner, the network device can learn of the synchronization signal/physical broadcast channel block selected by the terminal device.

As described above, in S404, the terminal device determines the RACH occasions corresponding to the second frequency domain position. The following specifically describes a manner in which the terminal device can determine the RACH occasions corresponding to the second frequency domain position.

Manner 1

Figure 5:
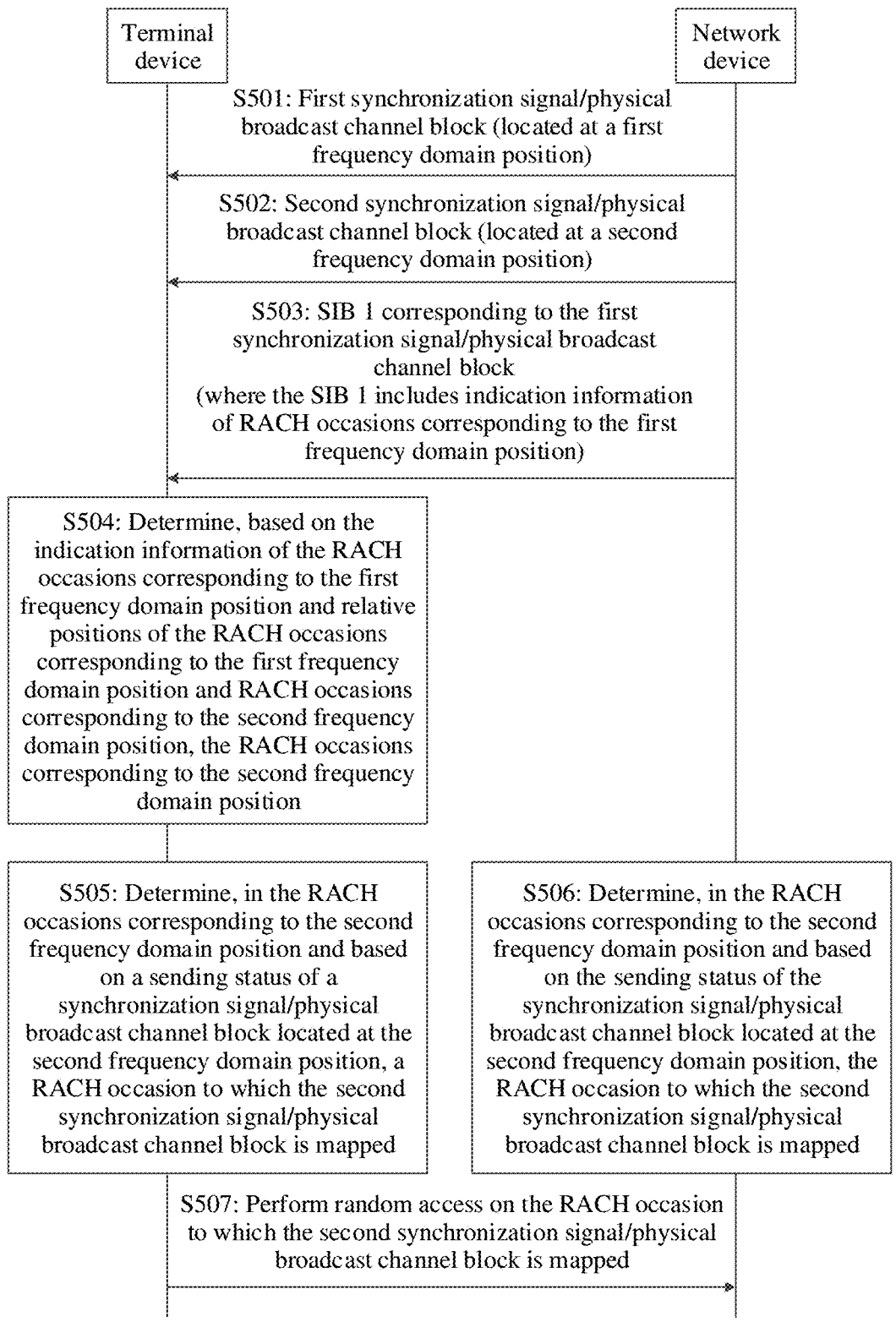
FIG. 5 is a flowchart of another communication method according to an embodiment of this application.

According to an existing solution, a SIB 1 corresponding to each synchronization signal/physical broadcast channel block includes indication information of RACH occasions corresponding to a frequency domain position of the synchronization signal/physical broadcast channel block. The solution may still be used, so that a terminal device can infer, based on the indication information of the RACH occasions corresponding to the frequency domain position, RACH occasions corresponding to another frequency domain position. FIG. 5 is a flowchart of the manner.

S501: The terminal device receives, from a network device, a first synchronization signal/physical broadcast channel block located at a first frequency domain position.

S502: The terminal device receives, from the network device, a second synchronization signal/physical broadcast channel block located at a second frequency domain position.

For specific descriptions of S501 and S502, respectively refer to the corresponding descriptions in S401 and S402. Details are not described herein again.

S503: The terminal device receives, from the network device, a SIB 1 corresponding to the first synchronization signal/physical broadcast channel block, where the SIB 1 corresponding to the first synchronization signal/physical broadcast channel block includes indication information of RACH occasions corresponding to the first frequency domain position.

Indication information of RACH occasions may include frequency domain information and/or time domain information. For example, the indication information of the RACH occasions may include a frequency domain start position, a frequency division multiplexing quantity, and time domain positions. The frequency domain start position may be a frequency domain position of a RACH occasion with a lowest frequency domain position in the RACH occasions. The frequency division multiplexing quantity is a quantity of RACH occasions multiplexed in frequency domain. For example, in FIG. 2C, in indication information of the RACH occasions corresponding to the frequency domain position 1, a frequency domain start position is a frequency domain position of the RACH occasion 1 corresponding to the frequency domain position 1, and a frequency division multiplexing quantity is 2.

S504: The terminal device determines, based on the indication information of the RACH occasions corresponding to the first frequency domain position, RACH occasions corresponding to the second frequency domain position.

For how to infer, based on the indication information of the RACH occasions corresponding to the first frequency domain position, the RACH occasions corresponding to the second frequency domain position, there are the following solutions in this embodiment. The solutions may be used in combination. For example, different solutions may be separately applied to frequency domain positions and time domain positions of the RACH occasions, or different solutions may be separately applied to a frequency domain start position and a frequency division multiplexing quantity of RACH occasions. In addition, examples in the solutions may alternatively be used in combination.

Solution 1: The terminal device may determine, based on the indication information of the RACH occasions corresponding to the first frequency domain position and with reference to a predefined rule, the RACH occasions corresponding to the second frequency domain position. The predefined rule may refer to association relationships/an association relationship between frequency domain positions and/or time domain positions of RACH occasions corresponding to different frequency domain positions or an association relationship between indication information of the RACH occasions corresponding to the different frequency domain positions.

For example, it may be agreed on in advance that time domain positions of the RACH occasions corresponding to the different frequency domain positions are the same. Therefore, the terminal device may infer that time domain positions of the RACH occasions corresponding to the first frequency domain position may be the same as time domain positions of the RACH occasions corresponding to the second frequency domain position. When one frequency domain position corresponds to a plurality of RACH occasions, RACH occasions corresponding to a frequency domain position as a whole may have a same time domain position as RACH occasions corresponding to a different frequency domain position as a whole, or each RACH occasion corresponding to a frequency domain position may have a same time domain position as that corresponding to a different frequency domain position.

For another example, it may be agreed on in advance that in indication information of the RACH occasions corresponding to the different frequency domain positions, information (for example, frequency division multiplexing quantities and time domain positions) other than frequency domain start positions is the same. Therefore, the terminal device may infer that information other than frequency domain start positions in the indication information of the RACH occasions corresponding to the first frequency domain position and indication information of the RACH occasions corresponding to the second frequency domain position is the same through comparison.

For still another example, it may be agreed on in advance that frequency division multiplexing quantities of the RACH occasions corresponding to the different frequency domain positions are the same. Therefore, the terminal device may infer that a frequency division multiplexing quantity of the RACH occasions corresponding to the first frequency domain position is the same as a frequency division multiplexing quantity of the RACH occasions corresponding to the second frequency domain position.

Solution 2: The terminal device may determine, based on the indication information of the RACH occasions corresponding to the first frequency domain position, an index of the first synchronization signal/physical broadcast channel block, and an index of the second synchronization signal/physical broadcast channel block and with reference to a predefined rule, the RACH occasions corresponding to the second frequency domain position. For specific descriptions of the predefined rule, refer to the corresponding descriptions in the foregoing solution 1. Details are not described herein again.

The index of the first synchronization signal/physical broadcast channel block may be an index of the first synchronization signal/physical broadcast channel block in consideration of only a frequency domain sequence, and the index of the second synchronization signal/physical broadcast channel block may be an index of the second synchronization signal/physical broadcast channel block in consideration of only a frequency domain sequence. Such an index may be briefly referred to as a frequency domain index. For example, in FIG. 2C, frequency domain indexes of the synchronization signal/physical broadcast channel block #0 and the synchronization signal/physical broadcast channel block #1 that are located at the frequency domain position 1 may be 0, and frequency domain indexes of the synchronization signal/physical broadcast channel block #0 and the synchronization signal/physical broadcast channel block #1 that are located at the frequency domain position 2 may be 1. Alternatively, the index of the first synchronization signal/physical broadcast channel block may be an index of the first synchronization signal/physical broadcast channel block in consideration of a frequency domain sequence and a time domain sequence, and the index of the second synchronization signal/physical broadcast channel block may be an index of the second synchronization signal/physical broadcast channel block in consideration of a frequency domain sequence and a time domain sequence. Such an index may be briefly referred to as an absolute index. For example, in FIG. 2C, an absolute index of the synchronization signal/physical broadcast channel block #0 located at the frequency domain position 1 may be 0, an absolute index of the synchronization signal/physical broadcast channel block #1 located at the frequency domain position 1 may be 1, an absolute index of the synchronization signal/physical broadcast channel block #0 located at the frequency domain position 2 may be 2, and an absolute index of the synchronization signal/physical broadcast channel block #1 located at the frequency domain position 2 may be 3. In addition, any information that can reflect a sequence of a frequency domain position in all frequency domain positions related to a synchronization signal/physical broadcast channel block may be used to replace an index of the synchronization signal/physical broadcast channel block.

For example, it may be agreed on in advance that time domain positions and frequency division multiplexing quantities of RACH occasions corresponding to different frequency domain positions are same, and RACH occasions corresponding to adjacent frequency domain positions are closely arranged in frequency domain. It should be understood that the adjacent frequency domain positions are not necessarily consecutive in frequency domain. The two frequency domain positions may be considered adjacent provided that there is no other frequency domain position that is between the two frequency domain positions and that is used to send a synchronization signal/physical broadcast channel block. The RACH occasions closely arranged in frequency domain are also not necessarily consecutive in frequency domain, and having a fixed spacing such as a subcarrier spacing may be considered as being closely arranged. In this case, if time domain positions of the RACH occasions corresponding to the first frequency domain position are known, time domain positions of the RACH occasions corresponding to the second frequency domain position may be directly determined. If a frequency domain index of the first frequency domain position is 0, and a frequency domain index of the second frequency domain position is 1, the RACH occasions corresponding to the first frequency domain position and the RACH occasions corresponding to the second frequency domain position are closely arranged in terms of frequency domain positions. When a frequency domain start position and a frequency division multiplexing quantity of the RACH occasions corresponding to the first frequency domain position have been learned, a frequency domain start position of the RACH occasions corresponding to the second frequency domain position may be inferred based on the frequency domain start position, a frequency division multiplexing quantity at the second frequency domain position may be directly determined based on the frequency division multiplexing quantity at the first frequency domain position. Alternatively, if a frequency domain index of the first frequency domain position is 1, and a frequency domain index of the second frequency domain position is 3, a frequency domain spacing between the RACH occasions corresponding to the first frequency domain position and the RACH occasions corresponding to the second frequency domain position may be inferred based on a frequency domain start position and a frequency division multiplexing quantity of the RACH occasions corresponding to the first frequency domain position, to determine a frequency domain start position of the RACH occasions corresponding to the second frequency domain position.

When determining the RACH occasions corresponding to the second frequency domain position, the terminal device may consider a subcarrier spacing of a RACH and/or a subcarrier spacing of a physical uplink shared channel (PUSCH). For example, differences/a difference between frequency domain positions and/or time domain positions of RACH occasions corresponding to different frequency channel numbers may be an expression, where the expression is related to the subcarrier spacing of the RACH and/or the subcarrier spacing of the PUSCH.

The index of the first synchronization signal/physical broadcast channel block and the index of the second synchronization signal/physical broadcast channel block may be included in a synchronization signal/physical broadcast channel block and/or a SIB 1. When the index of the first synchronization signal/physical broadcast channel block and the index of the second synchronization signal/physical broadcast channel block are included in the synchronization signal/physical broadcast channel block, the indexes may be included in a payload and/or a reserved bit of the synchronization signal/physical broadcast channel block. When the index of the first synchronization signal/physical broadcast channel block and the index of the second synchronization signal/physical broadcast channel block are included in the SIB 1, the indexes may be included in a reserved bit of the SIB 1 and/or a part that is of the SIB 1 and that is decoded only by a terminal device that performs synchronization signal/physical broadcast channel block frequency division multiplexing.

For example, the index of the first synchronization signal/physical broadcast channel block and the index of the second synchronization signal/physical broadcast channel block may be respectively included in a payload of the first synchronization signal/physical broadcast channel block and a payload of the second synchronization signal/physical broadcast channel block. Alternatively, the index of the first synchronization signal/physical broadcast channel block is included in a payload of the first synchronization signal/physical broadcast channel block, and the index of the second synchronization signal/physical broadcast channel block is included in the SIB 1 corresponding to the first synchronization signal/physical broadcast channel block. Certainly, the index of the second synchronization signal/physical broadcast channel block is included in a payload of the second synchronization signal/physical broadcast channel block, and the index of the first synchronization signal/physical broadcast channel block is included in a SIB 1 corresponding to the second synchronization signal/physical broadcast channel block. However, in this embodiment of this application, the terminal device can perform random access without obtaining the SIB 1 corresponding to the second synchronization signal/physical broadcast channel block. Alternatively, both the index of the first synchronization signal/physical broadcast channel block and the index of the second synchronization signal/physical broadcast channel block may be included in the SIB 1 corresponding to the first synchronization signal/physical broadcast channel block. In addition, the SIB 1 corresponding to the first synchronization signal/physical broadcast channel block may further include an index of another synchronization signal/physical broadcast channel block. For example, the SIB 1 corresponding to the first synchronization signal/physical broadcast channel block may include indexes of all synchronization signal/physical broadcast channel blocks in a synchronization signal/physical broadcast channel set, or the SIB 1 corresponding to the first synchronization signal/physical broadcast channel block may include an index of a synchronization signal/physical broadcast channel block other than the first synchronization signal/physical broadcast channel block.

Herein, the terminal device may first determine, based on the indication information of the RACH occasions corresponding to the first frequency domain position, the RACH occasions corresponding to the first frequency domain position, and then determine, based on the RACH occasions corresponding to the first frequency domain position, the RACH occasions corresponding to the second frequency domain position. Alternatively, the terminal device may directly determine, based on the indication information of the RACH occasions corresponding to the first frequency domain position, the RACH occasions corresponding to the second frequency domain position. This is not limited in this application.

S505: The terminal device determines, in the RACH occasions corresponding to the second frequency domain position and based on a sending status of a synchronization signal/physical broadcast channel block located at the second frequency domain position, a RACH occasion to which the second synchronization signal/physical broadcast channel block is mapped.

S506: The network device determines, in the RACH occasions corresponding to the second frequency domain position and based on the sending status of the synchronization signal/physical broadcast channel block located at the second frequency domain position, the RACH occasion to which the second synchronization signal/physical broadcast channel block is mapped.

S507: The terminal device performs random access on the RACH occasion to which the second synchronization signal/physical broadcast channel block is mapped.

For specific descriptions of S505, S506, and S507, respectively refer to the corresponding descriptions in S404, S405, and S406. Details are not described herein again. In addition, although S506 is performed after S503 in FIG. 5, a time sequence of the steps is not limited thereto. S506 may be performed before S503, or S506 and S503 may be performed simultaneously. For example, the network device may first determine mapping relationships between synchronization signal/physical broadcast channel blocks actually sent by the network device and RACH occasions. When the terminal device performs random access on the RACH occasion to which the second synchronization signal/physical broadcast channel block is mapped, a synchronization signal/physical broadcast channel block selected by the terminal device is inferred based on a mapping relationship that is in the mapping relationships and that is of the RACH occasion to which the second synchronization signal/physical broadcast channel block is mapped. Alternatively, the network device may determine, when the terminal device performs random access on the RACH occasion to which the second synchronization signal/physical broadcast channel block is mapped, a specific frequency domain position corresponding to the RACH occasion to which the second synchronization signal/physical broadcast channel block is mapped, then determine mapping relationships between synchronization signal/physical broadcast channel blocks actually sent at the frequency domain position and RACH occasions, and then infer, based on a mapping relationship that is in the mapping relationships and that is of the RACH occasion to which the second synchronization signal/physical broadcast channel block is mapped, a synchronization signal/physical broadcast channel block selected by the terminal device.

In this manner, the terminal device can infer, based on RACH occasions corresponding to a frequency domain position, a RACH occasion corresponding to another frequency domain position. Therefore, even if the terminal device switches to a new frequency domain position to perform random access, the terminal device does not need to repeatedly receive the SIB 1. This shortens a delay of switching a frequency domain position by the terminal device, accelerates a random access speed of the terminal device, and reduces energy consumption of the terminal device.

Manner 2

Figure 6:
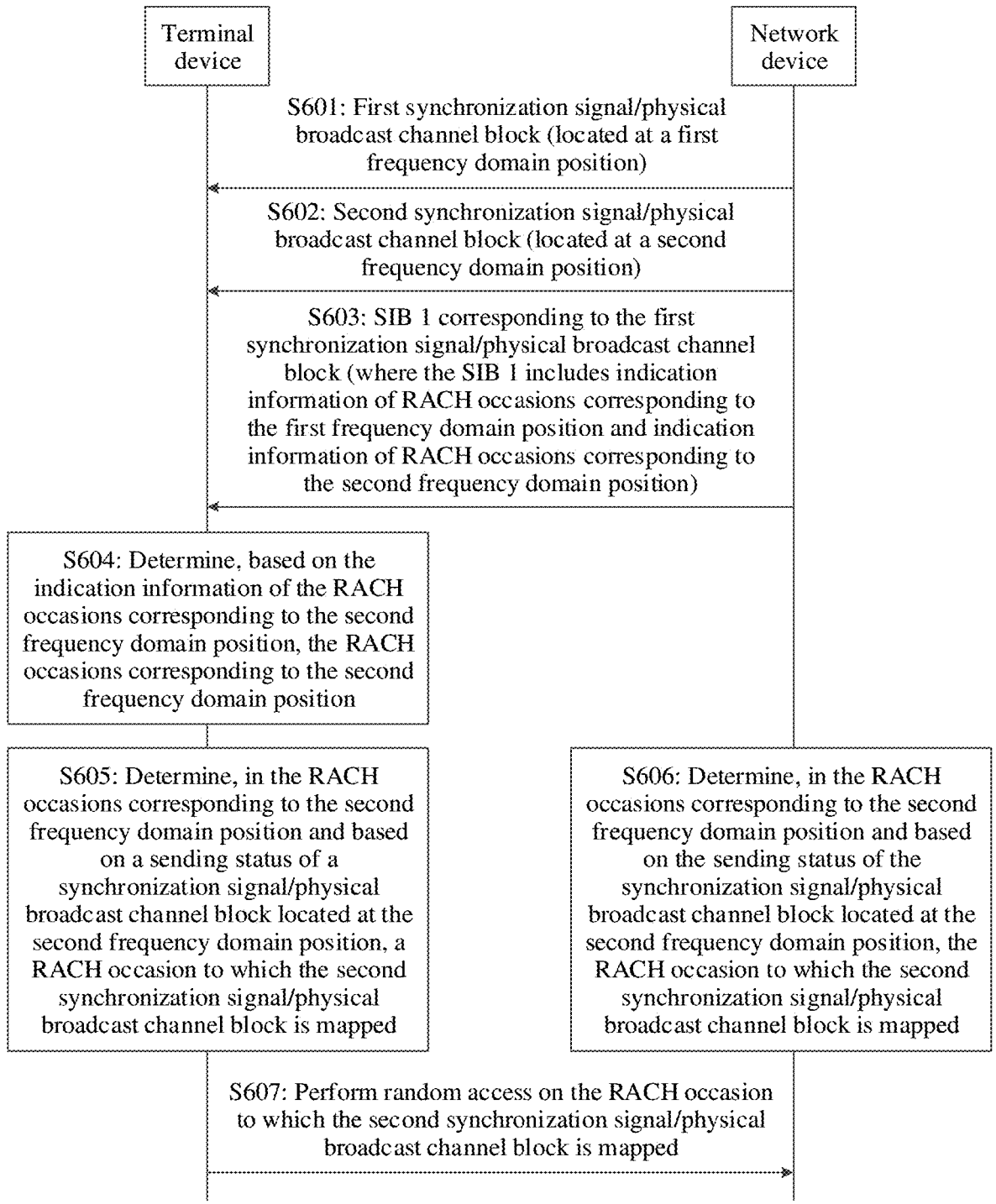
FIG. 6 is a flowchart of still another communication method according to an embodiment of this application.

Content included in a SIB 1 in an existing solution may be extended, so that a SIB 1 corresponding to each synchronization signal/physical broadcast channel block not only includes indication information of RACH occasions corresponding to a frequency domain position of the synchronization signal/physical broadcast channel block, but also includes all or some indication information of RACH occasions corresponding to another frequency domain position. Alternatively, content included in a synchronization signal/ physical broadcast channel block in an existing solution may be extended, so that each synchronization signal/physical broadcast channel block includes all or some indication information of RACH occasions corresponding to a frequency domain position of the synchronization signal/physical broadcast channel block. When the synchronization signal/physical broadcast channel block includes only some indication information, a terminal device may learn of remaining indication information in a manner such as pre-definition. FIG. 6 is a flowchart of the manner.

S601: The terminal device receives, from a network device, a first synchronization signal/physical broadcast channel block located at a first frequency domain position.

S602: The terminal device receives, from the network device, a second synchronization signal/physical broadcast channel block located at a second frequency domain position.

For specific descriptions of S601 and S602, respectively refer to the corresponding descriptions in S401 and S402. Details are not described herein again.

S603: The terminal device receives, from the network device, a SIB 1 corresponding to the first synchronization signal/physical broadcast channel block, where the SIB 1 corresponding to the first synchronization signal/physical broadcast channel block includes indication information of RACH occasions corresponding to the first frequency domain position. In addition, the SIB 1 corresponding to the first synchronization signal/physical broadcast channel block may further include indication information of RACH occasions corresponding to the second frequency domain position. This is described in detail in the following solution 1. Alternatively, indication information of RACH occasions corresponding to the second frequency domain position may be included in a second SSB. This is described in detail in the following solution 2. The solutions may be used in combination. For example, different solutions may be separately applied to frequency domain positions and time domain positions of the RACH occasions, or different solutions may be separately applied to a frequency domain start position and a frequency division multiplexing quantity of RACH occasions. In addition, examples in the solutions may alternatively be used in combination.

For specific descriptions of indication information of RACH occasions, refer to the corresponding descriptions in S503. Details are not described herein again.

Solution 1: The indication information of the RACH occasions corresponding to the second frequency domain position may be included in the SIB 1 corresponding to the first synchronization signal/physical broadcast channel block. Certainly, the indication information of the RACH occasions corresponding to the second frequency domain position is also included in a SIB 1 corresponding to the second synchronization signal/physical broadcast channel block. However, in this embodiment of this application, the terminal device can perform random access without obtaining the SIB 1 corresponding to the second synchronization signal/physical broadcast channel block. In addition to including the indication information of the RACH occasions corresponding to the second frequency domain position, the SIB 1 corresponding to the first synchronization signal/physical broadcast channel block may further include indication information of RACH occasions corresponding to another frequency domain position. For example, the SIB 1 corresponding to the first synchronization signal/physical broadcast channel block may include indication information of RACH occasions corresponding to all frequency domain positions, or the SIB 1 corresponding to the first synchronization signal/physical broadcast channel block may include indication information of RACH occasions corresponding to a frequency domain position other than the first frequency domain position. The terminal device may determine, based on an index of the second synchronization signal/physical broadcast channel block, which part of indication information of RACH occasions in a SIB 1 is the indication information of the RACH occasions corresponding to the second frequency domain position of the second synchronization signal/physical broadcast channel block.

The indication information of the RACH occasions corresponding to the second frequency domain position may be included in a reserved bit of the SIB 1 and/or a part that is of the SIB 1 and that is decoded only by a terminal device that performs synchronization signal/physical broadcast channel block frequency division multiplexing. For example, the indication information of the RACH occasions corresponding to the first frequency domain position may be included in a regular bit of the SIB 1, and the indication information of the RACH occasions corresponding to the second frequency domain position may be included in the reserved bit of the SIB 1. For another example, the indication information of the RACH occasions corresponding to the first frequency domain position may be included in a first part (namely, a part that can be decoded by both a terminal device that does not perform synchronization signal/physical broadcast channel block frequency division multiplexing and the terminal device that performs frequency division multiplexing) of the SIB 1, and the indication information of the RACH occasions corresponding to the second frequency domain position may be included in a second part (namely, the part that is decoded only by the terminal device that performs synchronization signal/physical broadcast channel block frequency division multiplexing) of the SIB 1.

Solution 2: The indication information of the RACH occasions corresponding to the second frequency domain position may be included in the second synchronization signal/physical broadcast channel block. Correspondingly, the indication information of the RACH occasions corresponding to the first frequency domain position may alternatively be included in the first synchronization signal/physical broadcast channel block. The terminal device in this embodiment may obtain the indication information of the RACH occasions corresponding to the first frequency domain position from the first synchronization signal/physical broadcast channel block, or may not need to obtain the indication information of the RACH occasions corresponding to the first frequency domain position from the first synchronization signal/physical broadcast channel block. From a perspective of an entire system, the indication information of the RACH occasions corresponding to the first frequency domain position in the first synchronization signal/physical broadcast channel block may be used by another terminal device that reselects the first synchronization signal/physical broadcast channel block.

The indication information of the RACH occasions corresponding to the second frequency domain position may be included in a payload and/or a reserved bit of the second synchronization signal/physical broadcast channel block. Correspondingly, the indication information of the RACH occasions corresponding to the first frequency domain position may alternatively be included in a payload and/or a reserved bit of the first synchronization signal/physical broadcast channel block.

Regardless of which solution is used, the indication information of the RACH occasions corresponding to the second frequency domain position may be only some indication information of the RACH occasions corresponding to the second frequency domain position, and remaining indication information may be indicated in another manner, for example, the manner 2 in combination with the manner 1. By way of example but not limitation, the terminal device may determine the remaining indication information by using a predefined rule based on the indication information of the RACH occasions at the first frequency domain position. For example, it may be agreed on in advance that some indication information of RACH occasions corresponding to different frequency domain positions is the same. In this case, the SIB 1 corresponding to the first synchronization signal/physical broadcast channel block may include indication information of the RACH occasions corresponding to the first frequency domain position and a part that is of the indication information of the RACH occasions corresponding to the second frequency domain position and that is different from the indication information of the RACH occasions corresponding to the first frequency domain position. Certainly, a part that is of the indication information of the RACH occasions corresponding to the first frequency domain position and that is the same as the indication information of the RACH occasions corresponding to the second frequency domain position is also essentially the indication information of the RACH occasions corresponding to the second frequency domain position. The foregoing descriptions are merely intended to describe a case in which a SIB does not need to repeatedly include the part of information that is universal for RACH occasions corresponding to different frequency domain positions.

For example, it may be agreed on in advance that a frequency division multiplexing quantity and time domain positions of the RACH occasions corresponding to the first frequency domain position are the same as a frequency division multiplexing quantity and time domain positions of the RACH occasions corresponding to the second frequency domain position. In this case, the indication information of the RACH occasions corresponding to the first frequency domain position may include a frequency domain start position, the frequency division multiplexing quantity, and the time domain positions that are of the RACH occasions corresponding to the first frequency domain position, and the indication information of the RACH occasions corresponding to the second frequency domain position may include a frequency domain start position that corresponds to the second frequency domain position. With reference to the example in the solution 1, the first part of the SIB 1 may include the frequency domain start position, the frequency division multiplexing quantity, and the time domain positions that are of the RACH occasions corresponding to the first frequency domain position, and the second part of the SIB 1 may include the frequency division multiplexing quantity and the frequency domain start position that correspond to the second frequency domain position.

For another example, it may be agreed on in advance that time domain positions of the RACH occasions corresponding to the first frequency domain position are the same as time domain positions of the RACH occasions corresponding to the second frequency domain position. In this case, the indication information of the RACH occasions corresponding to the first frequency domain position may include a frequency domain start position, a frequency division multiplexing quantity, and the time domain positions that are of the RACH occasions corresponding to the first frequency domain position, and the indication information of the RACH occasions corresponding to the second frequency domain position may include a frequency division multiplexing quantity and a frequency domain start position that correspond to the second frequency domain position. With reference to the example in the solution 2, the first part of the SIB 1 may include the frequency domain start position, the frequency division multiplexing quantity, and the time domain positions that are of the RACH occasions corresponding to the first frequency domain position, and the second synchronization signal/physical broadcast channel block may include the frequency division multiplexing quantity and the frequency domain start position that correspond to the second frequency domain position.

S604: The terminal device determines, based on the indication information of the RACH occasions corresponding to the second frequency domain position, the RACH occasions corresponding to the second frequency domain position.

S605: The terminal device determines, in the RACH occasions corresponding to the second frequency domain position and based on a sending status of a synchronization signal/physical broadcast channel block located at the second frequency domain position, a RACH occasion to which the second synchronization signal/physical broadcast channel block is mapped.

S606: The network device determines, in the RACH occasions corresponding to the second frequency domain position and based on the sending status of the synchronization signal/physical broadcast channel block located at the second frequency domain position, the RACH occasion to which the second synchronization signal/physical broadcast channel block is mapped.

S607: The terminal device performs random access on the RACH occasion to which the second synchronization signal/physical broadcast channel block is mapped.

For specific descriptions of S605, S606, and S607, respectively refer to the corresponding descriptions in S404, S405, and S406 and the corresponding descriptions in S505, S506, and S507. Details are not described herein again.

In this manner, the terminal device can determine, based on information in a SIB 1 corresponding to a synchronization signal/physical broadcast channel block located at a frequency domain position, RACH occasions corresponding to another frequency domain position, or the terminal device can determine, based on information in a SIB 1 corresponding to a synchronization signal/physical broadcast channel block located at a frequency domain position and with reference to information in a synchronization signal/physical broadcast channel block located at another frequency domain position and/or predefined information, RACH occasions corresponding to the respective frequency domain position. Therefore, even if the terminal device switches to a new frequency domain position to perform random access, the terminal device does not need to repeatedly receive the SIB 1. This shortens a delay of switching a frequency domain position by the terminal device, accelerates a random access speed of the terminal device, and reduces energy consumption of the terminal device.

Manner 3

Figure 7A:
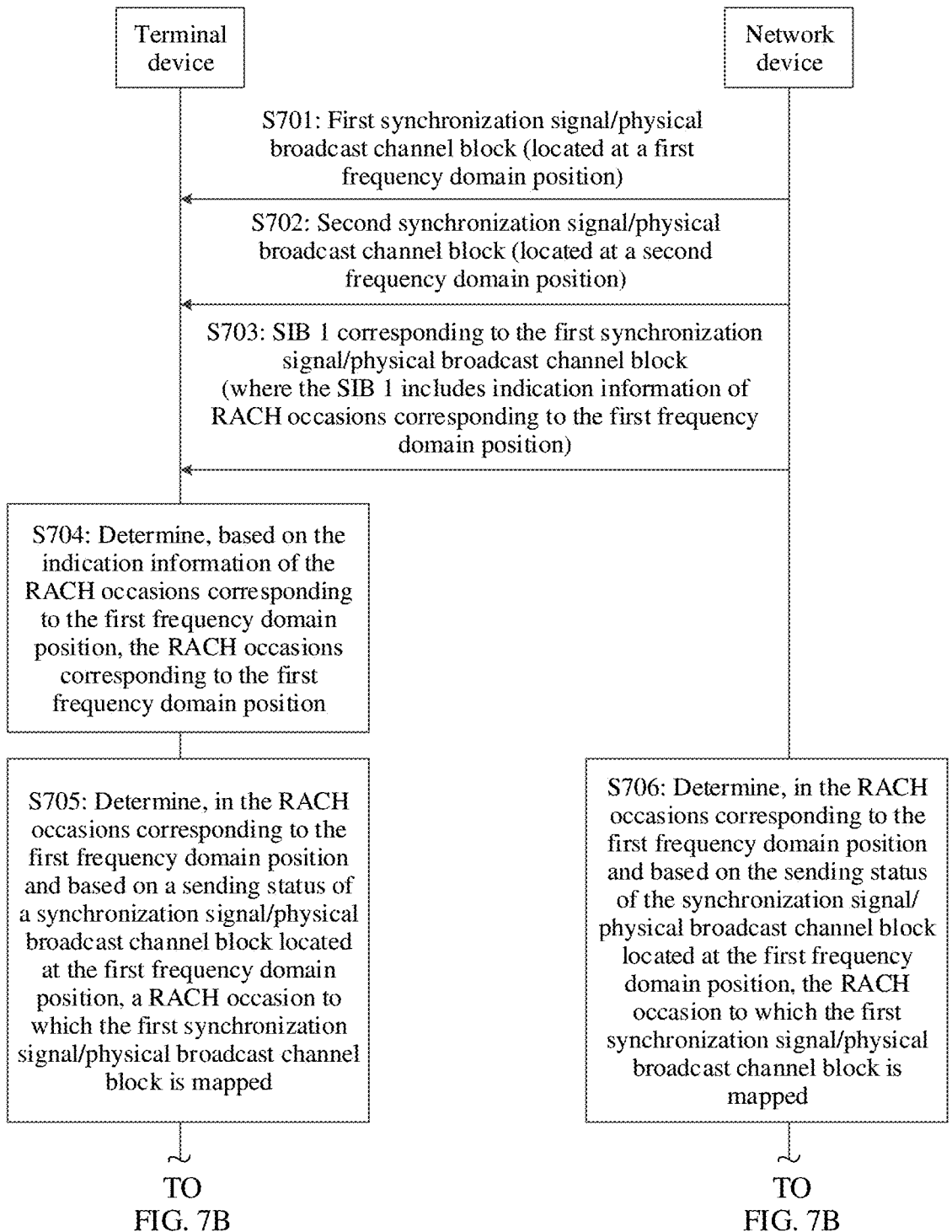
FIG. 7A and FIG. 7B are a flowchart of yet another communication method according to an embodiment of this application.
Figure 7B:
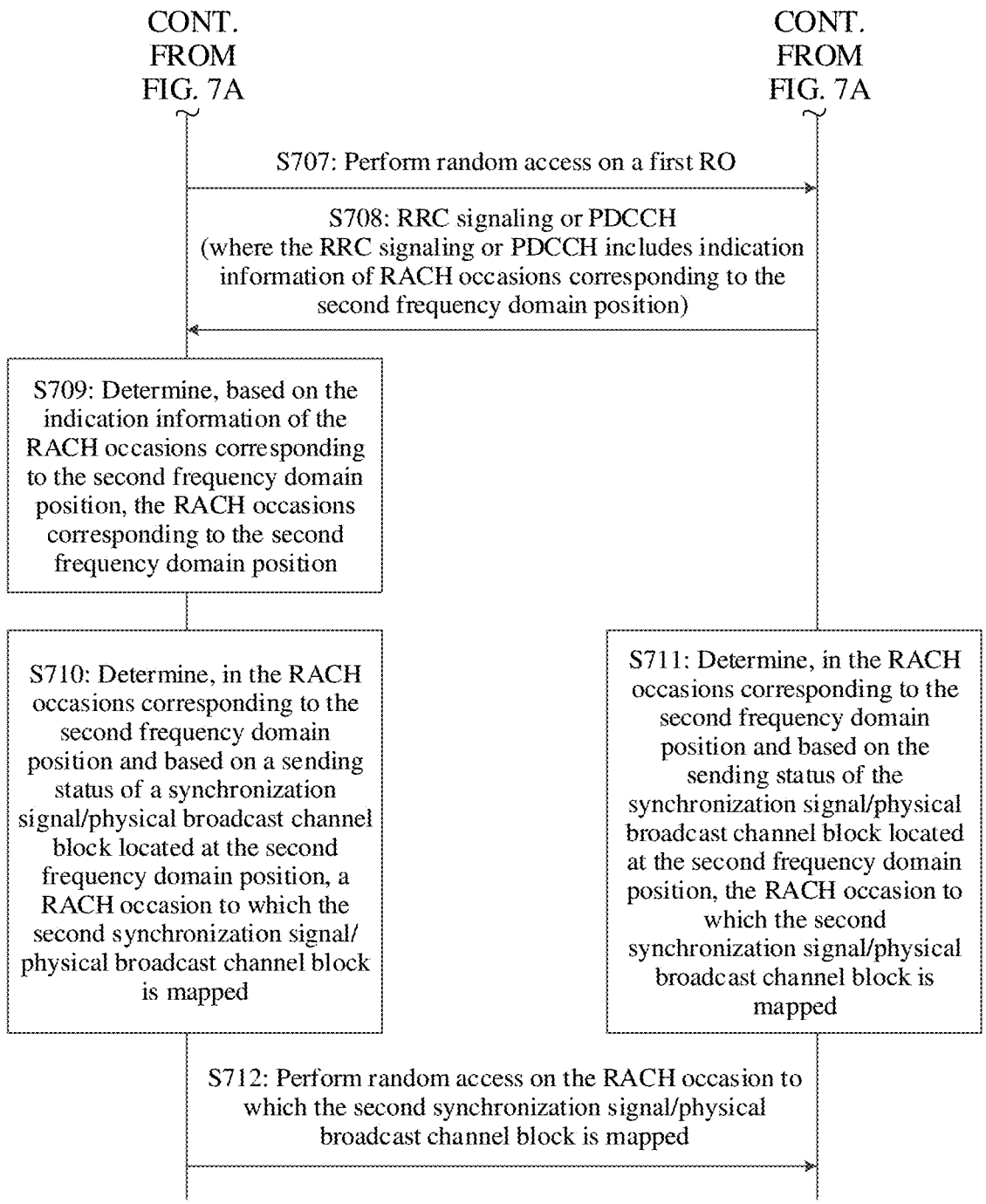

A design of a SIB 1 and a synchronization signal/physical broadcast channel block in an existing solution may still be used. After a terminal device completes random access, a network device sends, to the terminal device by using radio resource control (RRC) signaling or a PDCCH, indication information of RACH occasions corresponding to another frequency domain position. FIG. 7A and FIG. 7B are a flowchart of the manner.

S701: The terminal device receives, from the network device, a first synchronization signal/physical broadcast channel block located at a first frequency domain position.

S702: The terminal device receives, from the network device, a second synchronization signal/physical broadcast channel block located at a second frequency domain position.

For specific descriptions of S701 and S702, respectively refer to the corresponding descriptions in S401 and S402. Details are not described herein again.

S703: The terminal device receives, from the network device, a SIB 1 corresponding to the first synchronization signal/physical broadcast channel block, where the SIB 1 corresponding to the first synchronization signal/physical broadcast channel block includes indication information of RACH occasions corresponding to the first frequency domain position.

For specific descriptions of S703, refer to the corresponding descriptions in S503. Details are not described herein again.

S704: The terminal device determines, based on the indication information of the RACH occasions corresponding to the first frequency domain position, the RACH occasions corresponding to the first frequency domain position.

S705: The terminal device determines, in the RACH occasions corresponding to the first frequency domain position and based on a sending status of a synchronization signal/physical broadcast channel block located at the first frequency domain position, a RACH occasion to which the first synchronization signal/physical broadcast channel block is mapped.

S706: The network device determines, in the RACH occasions corresponding to the first frequency domain position and based on the sending status of the synchronization signal/physical broadcast channel block located at the first frequency domain position, the RACH occasion to which the first synchronization signal/physical broadcast channel block is mapped.

S707: The terminal device performs random access on the RACH occasion to which the first synchronization signal/physical broadcast channel block is mapped.

For specific descriptions of S705, S706, and S707, respectively refer to the corresponding descriptions in S404, S405, and S406. Details are not described herein again.

S708: The terminal device receives the RRC signaling or the PDCCH from the network device, where the RRC signaling or the PDCCH includes indication information of RACH occasions corresponding to the second frequency domain position. In addition, the RRC signaling or the PDCCH may further include indication information of RACH occasions corresponding to another frequency domain position. For example, the RRC signaling or the PDCCH may include indication information of RACH occasions corresponding to all frequency domain positions, or the RRC signaling or the PDCCH may include indication information of RACH occasions corresponding to a frequency domain position other than the first frequency domain position. The terminal device may determine, based on an index of the second synchronization signal/physical broadcast channel block, which part of indication information of RACH occasions in a SIB 1 is the indication information of the RACH occasions corresponding to the second frequency domain position of the second synchronization signal/physical broadcast channel block.

Herein, similar to that in the manner 2, the RRC signaling or the PDCCH may include only some indication information of the RACH occasions corresponding to the second frequency domain position, and remaining indication information may be indicated in another manner, for example, the manner 3 in combination with the manner 1 and/or the manner 2. By way of example but not limitation, the terminal device may determine the remaining indication information by using a predefined rule based on the indication information of the RACH occasions at the first frequency domain position. For example, it may be agreed on in advance that some indication information of RACH occasions corresponding to different frequency domain positions is the same. In this case, the RRC signaling or the PDCCH may include a part that is of the indication information of the RACH occasions corresponding to the second frequency domain position and that is different from the indication information of the RACH occasions corresponding to the first frequency domain position.

The RRC signaling or the PDCCH may further include a sending status of a synchronization signal/physical broadcast channel block located at the second frequency domain position and/or the index of the second synchronization signal/physical broadcast channel block. In addition, the RRC signaling or the PDCCH may further include a sending status of a corresponding synchronization signal/physical broadcast channel block located at another frequency domain position and/or an index of another synchronization signal/physical broadcast channel block. For example, the RRC signaling or the PDCCH may include sending statuses and/or indexes of all synchronization signal/physical broadcast channel blocks in a synchronization signal/physical broadcast channel set, or the RRC signaling or the PDCCH may include a sending status of a synchronization signal/physical broadcast channel block located at a frequency domain position other than the first frequency domain position and/or an index of a synchronization signal/physical broadcast channel block other than the first synchronization signal/physical broadcast channel block.

For specific descriptions of a sending status of a synchronization signal/physical broadcast channel block and an index of the synchronization signal/physical broadcast channel block, respectively refer to the corresponding descriptions in S404 and S504. Details are not described herein again.

After successfully accessing a cell in S707, the terminal device may need to perform random access again. For example, the terminal device may need to return from an RRC inactive mode to an RRC connected mode. In this case, if the terminal device selects the second synchronization signal/physical broadcast channel block located at the second frequency domain position, the terminal device may determine, based on the information received in S708, a RACH occasion to which the second synchronization signal/physical broadcast channel block is mapped.

Specifically, S709: The terminal device determines, based on the indication information of the RACH occasions corresponding to the second frequency domain position, the RACH occasions corresponding to the second frequency domain position.

S710: The terminal device determines, in the RACH occasions corresponding to the second frequency domain position and based on the sending status of the synchronization signal/physical broadcast channel block located at the second frequency domain position, the RACH occasion to which the second synchronization signal/physical broadcast channel block is mapped.

S711: The network device determines, in the RACH occasions corresponding to the second frequency domain position and based on the sending status of the synchronization signal/physical broadcast channel block located at the second frequency domain position, the RACH occasion to which the second synchronization signal/physical broadcast channel block is mapped.

S712: The terminal device performs random access on the RACH occasion to which the second synchronization signal/physical broadcast channel block is mapped.

For specific descriptions of S710, S711, and S712, respectively refer to the corresponding descriptions in S404, S405, and S406 and the corresponding descriptions in S505, S506, and S507. Details are not described herein again. It should be understood that, although S706 and S711 in FIG. 7A and FIG. 7B are two steps, S706 is performed before S707, and S711 is performed after S708 and before S712, S706 and S711 may be one step, and a time sequence of the steps is not limited thereto. S706 may be performed after S707, or S706 and S707 may be performed simultaneously. S711 may be performed before S708 or even S707, or may be performed after S711, or S711 and the steps may be performed simultaneously.

In this manner, the terminal device can learn, by using the RRC signaling or the PDCCH after random access, of the RACH occasions corresponding to the respective frequency domain position. Therefore, if the terminal device needs to perform random access again for some reasons after accessing the cell, even if a synchronization signal/physical broadcast channel block selected by the terminal device is a synchronization signal/physical broadcast channel block at the respective frequency domain position in this case, the terminal device does not need to repeatedly receive a SIB. This shortens a delay of switching a frequency domain position by the terminal device, accelerates a random access speed of the terminal device, and reduces energy consumption of the terminal device.

In addition, a terminal device that does not perform synchronization signal/physical broadcast channel block frequency division multiplexing (including a terminal device that does not support synchronization signal/physical broadcast channel block frequency division multiplexing and a terminal device that supports synchronization signal/physical broadcast channel block frequency division multiplexing but does not perform synchronization signal/physical broadcast channel block frequency division multiplexing) considers by default that all synchronization signal/physical broadcast channel blocks in one synchronization signal/physical broadcast channel set are sent at one frequency domain position. When performing random access, such a terminal device can select only a synchronization signal/physical broadcast channel block located at one frequency domain position, and cannot select a synchronization signal/physical broadcast channel block located at another frequency domain position. In this manner, the design of the SIB 1 and the synchronization signal/physical broadcast channel block in the existing solution does not need to be modified, and impact on the terminal device that does not perform synchronization signal/physical broadcast channel block frequency division multiplexing is reduced.

In embodiments of this application, an association degree (for example, a similarity degree) between RACH occasions corresponding to different frequency domain positions may affect a delay of switching a frequency domain position by a terminal and/or energy consumption of the terminal device. For example, if the association degree between the RACH occasions corresponding to the different frequency domain positions is high, the terminal device may spend a short time and/or little energy consumption to determine the RACH occasions at the second frequency domain position in the manner 1. Alternatively, if the association degree between the RACH occasions corresponding to the different frequency domain positions is high, the indication information that is included in the SIB 1 and that is of the RACH occasions corresponding to the respective frequency domain position is little in the manner 2. Alternatively, if the association degree between the RACH occasions corresponding to the different frequency domain positions is high, the indication information that is included in the RRC signaling or the PDCCH and that is of the RACH occasions corresponding to the respective frequency domain position is little in the manner 3. Therefore, RACH occasions and indication information of the RACH occasions may be designed according to the idea.

For the RACH occasions, the following solutions may be considered. The solutions may be used in combination.

Solution 1: Time domain positions of the RACH occasions corresponding to the different frequency domain positions may be the same. That is, the time domain positions of the RACH occasions corresponding to the first frequency domain position may be the same as the time domain positions of the RACH occasions corresponding to the second frequency domain position. For specific descriptions of a case in which the time domain positions of the RACH occasion are the same, refer to the corresponding descriptions in S504. Details are not described herein again.

Solution 2: The RACH occasions corresponding to the different frequency domain positions may not overlap. That is, the RACH occasions corresponding to the first frequency domain position may not overlap the RACH occasions corresponding to the second frequency domain position. Not overlapping herein is not limited to not overlapping in time domain or not overlapping in frequency domain, and only not overlapping in a comprehensive view of the time domain and the frequency domain is needed. Certainly, if time domain positions of the RACH occasions corresponding to the different frequency domain positions are set to be the same, and the RACH occasions corresponding to the different frequency domain positions are set to be not overlapping, not overlapping herein is equivalent to not overlapping in frequency domain.

Solution 3: RACH occasions corresponding to adjacent frequency domain positions may be closely arranged in frequency domain and/or time domain. That is, the RACH occasions corresponding to the first frequency domain position and the RACH occasions corresponding to the second frequency domain position may be closely arranged in frequency domain and/or time domain. Certainly, if time domain positions of the RACH occasions corresponding to the different frequency domain positions are set to be the same, the RACH occasions corresponding to the different frequency domain positions can be closely arranged only in frequency domain. For specific descriptions of being adjacent and be closely arranged, refer to the corresponding descriptions in S504. Details are not described herein again.

For example, in FIG. 2C, the RACH occasion 1 and the RACH occasion 2 below are the RACH occasions corresponding to the frequency domain position 1, and the RACH occasion 1 and RACH occasion 2 above are the RACH occasions corresponding to the frequency domain position 2. It can be learned that time domain positions of the four RACH occasions are the same, and the RACH occasions do not overlap each other, and are closely arranged in frequency domain.

For the indication information of the RACH occasions, the following solutions may be considered. The solutions may be used in combination.

Solution 1: In indication information of the RACH occasions corresponding to the different frequency domain positions, frequency domain start positions are different, and other information (for example, frequency division multiplexing quantities and time domain information) may be the same. To be specific, the frequency domain start position of the RACH occasions corresponding to the first frequency domain position is different from the frequency domain start position of the RACH occasions corresponding to the second frequency domain position, and other information in the indication information of the RACH occasions corresponding to the first frequency domain position and the indication information of the RACH occasions corresponding to the second frequency domain position may be the same through comparison.

Solution 2: Time domain positions of the RACH occasions corresponding to the different frequency domain positions may be the same. That is, the time domain positions of the RACH occasions corresponding to the first frequency domain position may be the same as the time domain positions of the RACH occasions corresponding to the second frequency domain position.

Solution 3: Frequency division multiplexing quantities of the RACH occasions corresponding to the different frequency domain positions may be the same. To be specific, the frequency division multiplexing quantity of the RACH occasions corresponding to the first frequency domain position may be the same as the frequency division multiplexing quantity of the RACH occasions corresponding to the second frequency domain position.

The following describes, with reference to the accompanying drawings, apparatuses configured to implement the foregoing methods in embodiments of this application. Therefore, all the foregoing content may be used in the following embodiments. Repeated content is not described again.

Figure 8:
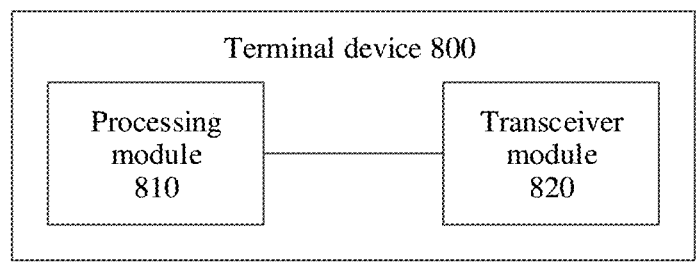
FIG. 8 is a schematic block diagram of a terminal device according to an embodiment of this application.

FIG. 8 is a schematic block diagram of a terminal device 800 according to an embodiment of this application. The terminal device 800 includes a processing module 810 and a transceiver module 820. For example, the terminal device 800 may be a terminal device, or may be a chip used in the terminal device or another combined device or a component that has the functions of the terminal device. When the terminal device 800 is a terminal device, the transceiver module 820 may be a transceiver, where the transceiver may include an antenna, a radio frequency circuit, and the like, and the processing module 810 may be a processor, where the processor may include one or more central processing units (CPU). When the terminal device 800 is a component that has the functions of the terminal device, the transceiver module 820 may be a radio frequency unit, and the processing module 810 may be a processor, for example, a baseband processor. When the terminal device 800 is a chip system, the transceiver module 820 may be an input/output interface of a chip (for example, a baseband chip), and the processing module 810 may be a processor of the chip system, and may include one or more central processing units. It should be understood that the processing module 810 in this embodiment of this application may be implemented by a processor or a processor-related circuit component, and the transceiver module 820 may be implemented by a transceiver or a transceiver-related circuit component.

The processing module 810 may be configured to perform all operations performed by the terminal device in the method embodiments except sending and receiving operations, and/or configured to support another process of the technology described in this specification. The transceiver module 820 may be configured to perform all receiving operations performed by the terminal device in the method embodiments, and/or configured to support another process of the technology described in this specification.

The transceiver module 820 may be one function module. The function module can complete both a sending operation and a receiving operation. For example, the transceiver module 820 may be configured to perform all sending operations and receiving operations performed by the terminal device in the method embodiments. For example, when performing the sending operations, the transceiver module 820 may be considered as a sending module, when performing the receiving operations, the transceiver module 820 may be considered as a receiving module. Alternatively, the transceiver module 820 may be two function modules. The transceiver module may be considered as a general term of the two function modules. The two function modules are a sending module and a receiving module. The sending module is configured to complete a sending operation. For example, the sending module may be configured to perform all sending operations performed by the terminal device in the method embodiments. The receiving module is configured to complete a receiving operation. For example, the receiving module may be configured to perform all receiving operations performed by the terminal device in the method embodiments.

The transceiver module 820 is configured to receive a first synchronization signal/physical broadcast channel block located at a first frequency domain position.

The transceiver module 820 is further configured to receive a second synchronization signal/physical broadcast channel block located at a second frequency domain position.

The processing module 810 is configured to determine random access channel RACH occasions corresponding to the second frequency domain position.

The processing module 810 is further configured to determine, in the RACH occasions corresponding to the second frequency domain position and based on a sending status of a synchronization signal/physical broadcast channel block located at the second frequency domain position, a RACH occasion to which the second synchronization signal/physical broadcast channel block is mapped.

The transceiver module 820 is further configured to perform random access on the RACH occasion to which the second synchronization signal/physical broadcast channel block is mapped.

In an optional implementation, the transceiver module 820 is further configured to receive a system information block type 1 SIB 1 corresponding to the first synchronization signal/physical broadcast channel block, where the SIB 1 includes indication information of RACH occasions corresponding to the first frequency domain position. The processing module 810 is specifically configured to determine, based on the indication information of the RACH occasions corresponding to the first frequency domain position, the RACH occasions corresponding to the second frequency domain position.

In an optional implementation, the processing module 810 is specifically configured to determine, based on the indication information of the RACH occasions corresponding to the first frequency domain position, an index of the first synchronization signal/physical broadcast channel block, and an index of the second synchronization signal/physical broadcast channel block, the RACH occasions corresponding to the second frequency domain position.

In an optional implementation, the index of the first synchronization signal/physical broadcast channel block is an index of the first synchronization signal/physical broadcast channel block in consideration of only a frequency domain sequence, and the index of the second synchronization signal/physical broadcast channel block is an index of the second synchronization signal/physical broadcast channel block in consideration of only a frequency domain sequence, or the index of the first synchronization signal/physical broadcast channel block is an index the first synchronization signal/physical broadcast channel block in consideration of a frequency domain sequence and a time domain sequence, and the index of the second synchronization signal/physical broadcast channel block is an index of the second synchronization signal/physical broadcast channel block in consideration of a frequency domain sequence and a time domain sequence.

In an optional implementation, the index of the first synchronization signal/physical broadcast channel block and the index of the second synchronization signal/physical broadcast channel block are included in the SIB 1, or the index of the first synchronization signal/physical broadcast channel block is included in the first synchronization signal/physical broadcast channel block, and the index of the second synchronization signal/physical broadcast channel block is included in the second synchronization signal/physical broadcast channel block.

In an optional implementation, the transceiver module 820 is further configured to receive a system information block type 1 SIB 1 corresponding to the first synchronization signal/physical broadcast channel block, where the SIB 1 includes indication information of RACH occasions corresponding to the first frequency domain position, where indication information of the RACH occasions corresponding to the second frequency domain position is included in at least one of the SIB 1 and the second synchronization signal/physical broadcast channel block. The processing module 810 is specifically configured to determine, based on the indication information of the RACH occasions corresponding to the second frequency domain position, the RACH occasions corresponding to the second frequency domain position.

In an optional implementation, the transceiver module 820 is further configured to receive a system information block type 1 SIB 1 corresponding to the first synchronization signal/physical broadcast channel block, where the SIB 1 includes indication information of RACH occasions corresponding to the first frequency domain position. The processing module 810 is further configured to determine, based on the indication information of the RACH occasions corresponding to the first frequency domain position, the RACH occasions corresponding to the first frequency domain position. The processing module 810 is further configured to determine, in the RACH occasions corresponding to the first frequency domain position and based on a sending status of a synchronization signal/physical broadcast channel block located at the first frequency domain position, a RACH occasion to which the first synchronization signal/physical broadcast channel block is mapped. The transceiver module 820 is further configured to perform random access on the RACH occasion to which the first synchronization signal/physical broadcast channel block is mapped. The transceiver module 820 is further configured to receive radio resource control RRC signaling or a physical downlink control channel PDCCH, where the RRC signaling or the PDCCH includes indication information of the RACH occasions corresponding to the second frequency domain position. The processing module 810 is specifically configured to determine, based on the indication information of the RACH occasions corresponding to the second frequency domain position, the RACH occasions corresponding to the second frequency domain position.

Figure 9:
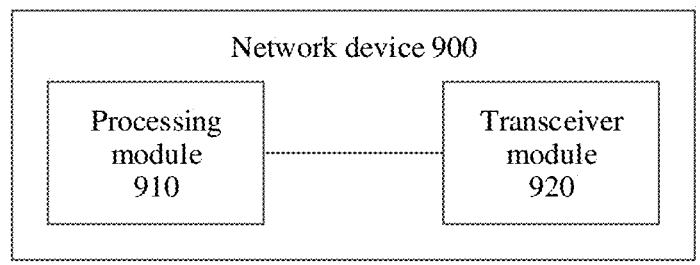
FIG. 9 is a schematic block diagram of a network device according to an embodiment of this application.

FIG. 9 is a schematic block diagram of a network device 900 according to an embodiment of this application. The network device 900 includes a processing module 910 and a transceiver module 920. For example, the network device 900 may be a network device, or may be a chip used in the network device or another combined device or a component that has the functions of the network device. When the network device 900 is a network device, the transceiver module 920 may be a transceiver, where the transceiver may include an antenna, a radio frequency circuit, and the like, and the processing module 910 may be a processor, where the processor may include one or more central processing units (CPU). When the network device 900 is a component that has the functions of the network device, the transceiver module 920 may be a radio frequency unit, and the processing module 910 may be a processor, for example, a baseband processor. When the network device 900 is a chip system, the transceiver module 920 may be an input/output interface of a chip (for example, a baseband chip), and the processing module 910 may be a processor of the chip system, and may include one or more central processing units. It should be understood that the processing module 910 in this embodiment of this application may be implemented by a processor or a processor-related circuit component, and the transceiver module 920 may be implemented by a transceiver or a transceiver-related circuit component.

The processing module 910 may be configured to perform all operations performed by the network device in the method embodiments except sending and receiving operations, and/or configured to support another process of the technology described in this specification. The transceiver module 920 may be configured to perform all receiving operations performed by the network device in the method embodiments, and/or configured to support another process of the technology described in this specification.

The transceiver module 920 may be one function module. The function module can complete both a sending operation and a receiving operation. For example, the transceiver module 920 may be configured to perform all sending operations and receiving operations performed by the network device in the method embodiments. For example, when performing the sending operations, the transceiver module 920 may be considered as a sending module, when performing the receiving operations, the transceiver module 920 may be considered as a receiving module. Alternatively, the transceiver module 920 may be two function modules. The transceiver module may be considered as a general term of the two function modules. The two function modules are a sending module and a receiving module. The sending module is configured to complete a sending operation. For example, the sending module may be configured to perform all sending operations performed by the network device in the method embodiments. The receiving module is configured to complete a receiving operation. For example, the receiving module may be configured to perform all receiving operations performed by the network device in the method embodiments.

The transceiver module 920 is configured to send a first synchronization signal/physical broadcast channel block located at a first frequency domain position.

The transceiver module 920 is further configured to send a second synchronization signal/physical broadcast channel block located at a second frequency domain position.

The processing module 910 is configured to determine, in random access channel RACH occasions corresponding to the first frequency domain position and based on a sending status of a synchronization signal/physical broadcast channel block located at the first frequency domain position, a RACH occasion to which the first synchronization signal/physical broadcast channel block is mapped.

The processing module 910 is further configured to determine, in RACH occasions corresponding to the second frequency domain position and based on a sending status of a synchronization signal/physical broadcast channel block located at the second frequency domain position, a RACH occasion to which the second synchronization signal/physical broadcast channel block is mapped.

In an optional implementation, the first synchronization signal/physical broadcast channel block includes an index of the first synchronization signal/physical broadcast channel block, and the second synchronization signal/physical broadcast channel block includes an index of the second synchronization signal/physical broadcast channel block, or the transceiver module 920 is further configured to send a system information block type 1 SIB 1 corresponding to the first synchronization signal/physical broadcast channel block, where the SIB 1 includes indication information of the RACH occasions corresponding to the first frequency domain position, an index of the first synchronization signal/physical broadcast channel block, and an index of the second synchronization signal/physical broadcast channel block.

In an optional implementation, the index of the first synchronization signal/physical broadcast channel block is an index of the first synchronization signal/physical broadcast channel block in consideration of only a frequency domain sequence, and the index of the second synchronization signal/physical broadcast channel block is an index of the second synchronization signal/physical broadcast channel block in consideration of only a frequency domain sequence, or the index of the first synchronization signal/physical broadcast channel block is an index the first synchronization signal/physical broadcast channel block in consideration of a frequency domain sequence and a time domain sequence, and the index of the second synchronization signal/physical broadcast channel block is an index of the second synchronization signal/physical broadcast channel block in consideration of a frequency domain sequence and a time domain sequence.

In an optional implementation, the transceiver module 920 is further configured to send a system information block type 1 SIB 1 corresponding to the first synchronization signal/physical broadcast channel block, where the SIB 1 includes indication information of the RACH occasions corresponding to the first frequency domain position, where indication information of the RACH occasions corresponding to the second frequency domain position is included in at least one of the SIB 1 and the second synchronization signal/physical broadcast channel block.

In an optional implementation, the transceiver module 920 is further configured to send a system information block type 1 SIB 1 corresponding to the first synchronization signal/physical broadcast channel block, where the SIB 1 includes indication information of the RACH occasions corresponding to the first frequency domain position. The transceiver module 920 is further configured to, when a terminal device performs random access on the RACH occasion to which the first synchronization signal/physical broadcast channel block is mapped, send radio resource control RRC signaling or a physical downlink control channel PDCCH to the terminal device, where the RRC signaling or the PDCCH includes indication information of the RACH occasions corresponding to the second frequency domain position.

An embodiment of this application further provides a communication apparatus. The communication apparatus may be a terminal device, or may be a circuit. The communication apparatus may be configured to perform an action performed by the terminal device in the foregoing method embodiments.

Figure 10:
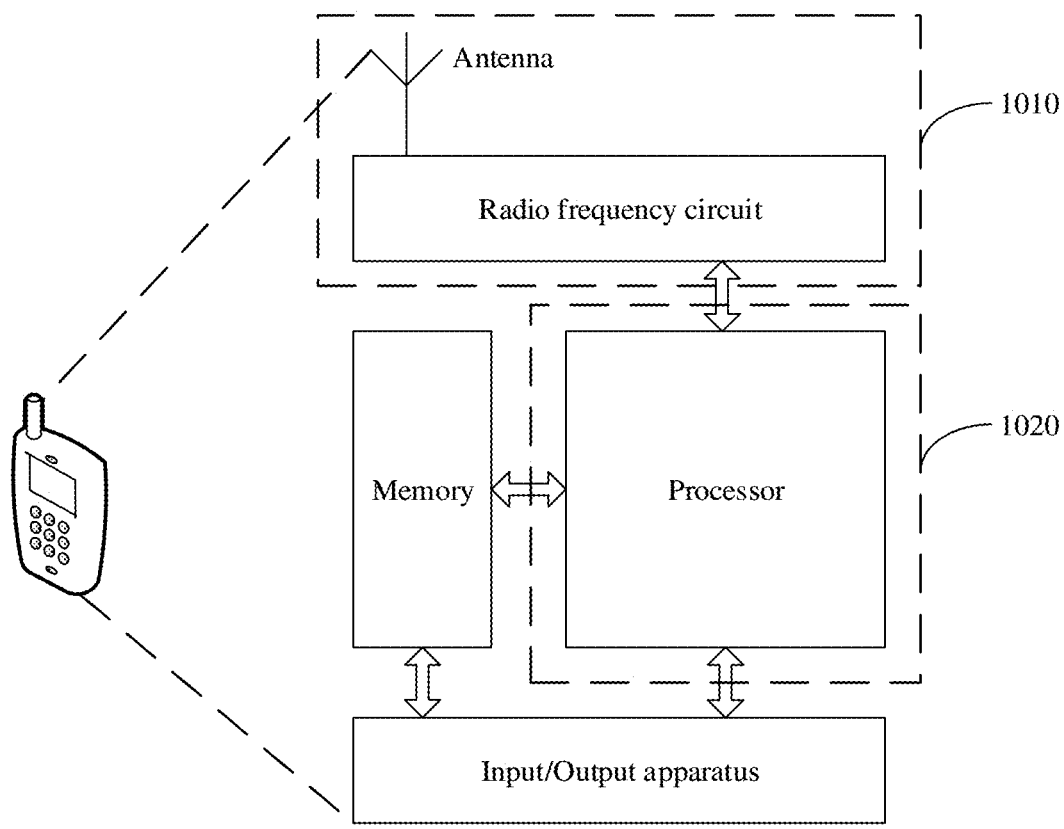
FIG. 10 is a schematic block diagram of a communication apparatus according to an embodiment of this application.

When the communication apparatus is a terminal device, FIG. 10 is a simplified schematic diagram of a structure of a terminal device. For ease of understanding and convenience of figure illustration, an example in which the terminal device is a mobile phone is used in FIG. 10. As shown in FIG. 10, the terminal device includes a processor a memory, a radio frequency circuit, an antenna, and an input/output apparatus. The processor is mainly configured to process a communication protocol and communication data, control the terminal device, execute a software program, process data of the software program, and the like. The memory is configured to store the software program and the data. The radio frequency circuit is mainly configured to perform conversion between a baseband signal and a radio frequency signal and process the radio frequency signal. The antenna is mainly configured to send and receive a radio frequency signal in a form of an electromagnetic wave. The input/output apparatus, for example, a touchscreen, a display, or a keyboard, is mainly configured to receive data input by a user, and output data to the user. It should be noted that some types of terminal devices may have no input/output apparatus.

When data needs to be sent, the processor performs baseband processing on to-be-sent data, and then outputs the baseband signal to the radio frequency circuit. After performing radio frequency processing on the baseband signal, the radio frequency circuit sends the radio frequency signal to the outside by using the antenna in an electromagnetic wave form. When data is sent to the terminal device, the radio frequency circuit receives a radio frequency signal through the antenna, converts the radio frequency signal into a baseband signal, and outputs the baseband signal to the processor. The processor converts the baseband signal into data and processes the data. For ease of description, FIG. 10 shows only one memory and one processor. An actual terminal device product may include one or more processors and one or more memories. The memory may also be referred to as a storage medium, a storage device, or the like. The memory may be disposed independent of the processor or may be integrated with the processor. This is not limited in this embodiment of this application.

In this embodiment of this application, the antenna and the radio frequency circuit that have receiving and sending functions may be considered as a transceiver unit of the terminal device (where the transceiver unit may be one function unit, and the function unit can implement a sending function and a receiving function, or the transceiver unit may include two function units: a receiving unit that can implement a receiving function and a sending unit that can implement a sending function), and the processor that has a processing function is considered as a processing unit of the terminal device. As shown in FIG. 10, the terminal device includes the transceiver unit 1010 and the processing unit 1020. The transceiver unit may also be referred to as a transceiver, a transceiver, a transceiver apparatus, or the like.

The processing unit may also be referred to as a processor, a processing board, a processing module, a processing apparatus, or the like. Optionally, a component configured to implement a receiving function in the transceiver unit 1010 may be considered as a receiving unit, and a component configured to implement a sending function in the transceiver unit 1010 may be considered as a sending unit. That is, the transceiver unit 1010 includes the receiving unit and the sending unit. The transceiver unit may sometimes be referred to as a transceiver, a transceiver, a transceiver circuit, or the like. The receiving unit may also be sometimes referred to as a receiver, a receiver, a receiver circuit, or the like. The sending unit sometimes may also be referred to as a transmitter, a transmitter, a transmitter circuit, or the like.

It should be understood that the transceiver unit 1010 is configured to perform a sending operation and a receiving operation on a terminal device side in the foregoing method embodiments, and the processing unit 1020 is configured to perform an operation other than the receiving operation and the sending operation of the terminal device in the foregoing method embodiments.

When the communication apparatus is a chip-type apparatus or circuit, the apparatus may include a transceiver unit and a processing unit. The transceiver unit may be an input/output circuit and/or a communication interface. The processing unit is an integrated processor, a microprocessor, or an integrated circuit.

Figure 11:
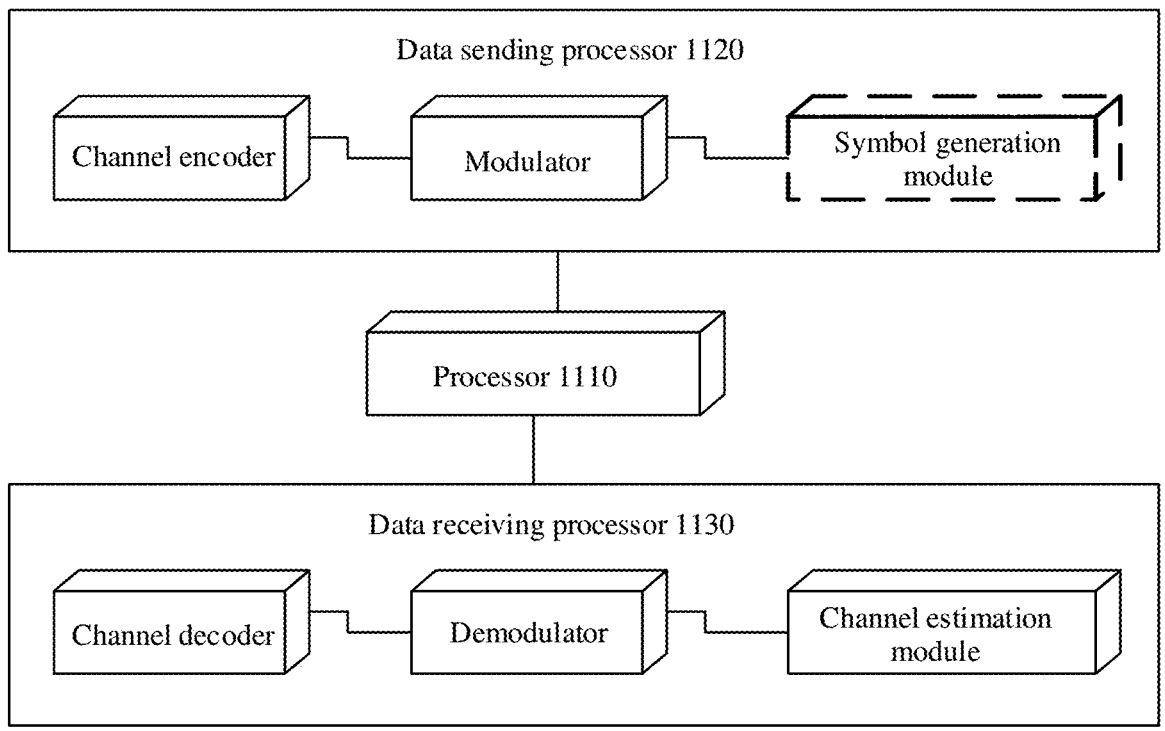
FIG. 11 is another schematic block diagram of a communication apparatus according to an embodiment of this application.

When the communication apparatus in this embodiment is a terminal device, refer to a device shown in FIG. 11. Although FIG. 11 shows a channel encoder and a channel decoder, it may be understood that the modules are merely examples, and do not constitute a limitation on this embodiment.

Figure 12:
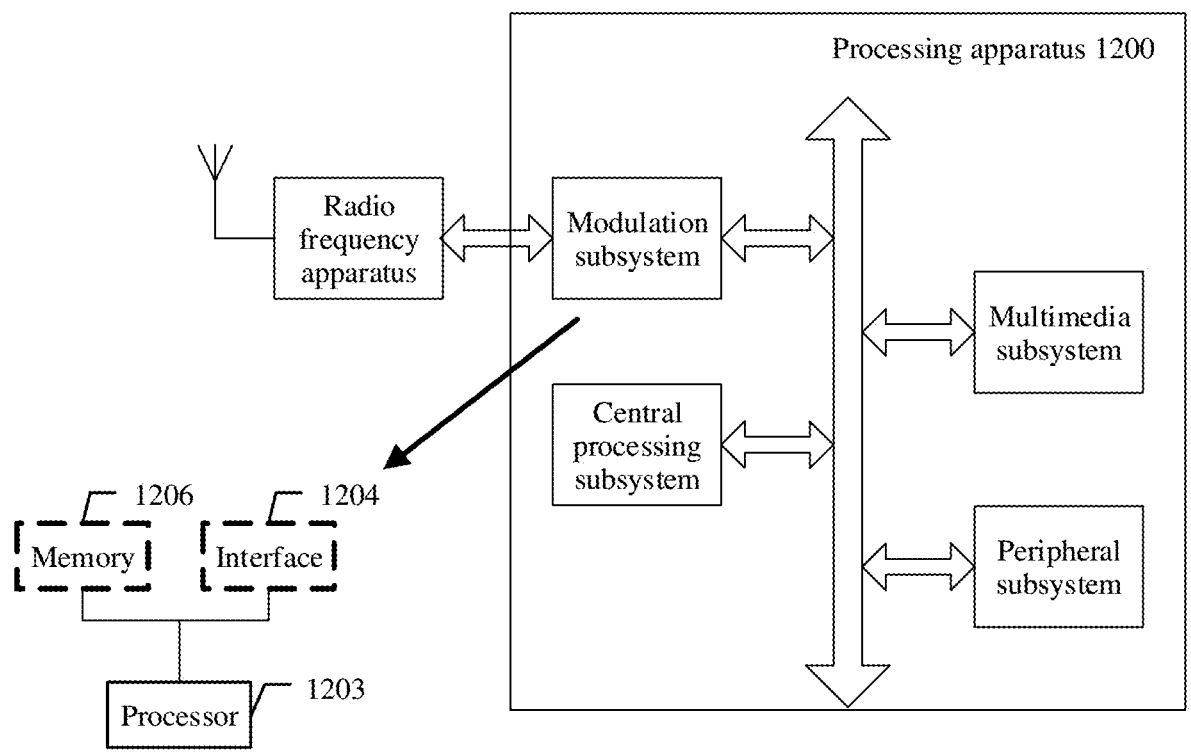
FIG. 12 is still another schematic block diagram of a communication apparatus according to an embodiment of this application.

FIG. 12 shows another form of this embodiment. A processing apparatus 1200 includes modules such as a modulation subsystem, a central processing subsystem, and a peripheral subsystem. The communication apparatus in embodiments may be used as the modulation subsystem in the processing apparatus 1200. Specifically, the modulation subsystem may include a processor 1203 and an interface 1204. In another variation, the modulation subsystem includes a memory 1206, a processor 1203, and a program that is stored in the memory 1206 and that can be run on the processor. When executing the program, the processor 1203 implements the methods on the terminal device side in the foregoing method embodiments. It should be noted that the memory 1206 may be non-volatile or volatile. The memory 1206 may be located in the modulation subsystem, or may be located in the processing apparatus 1200, provided that the memory 1206 can be connected to the processor 1203.

Figure 13:
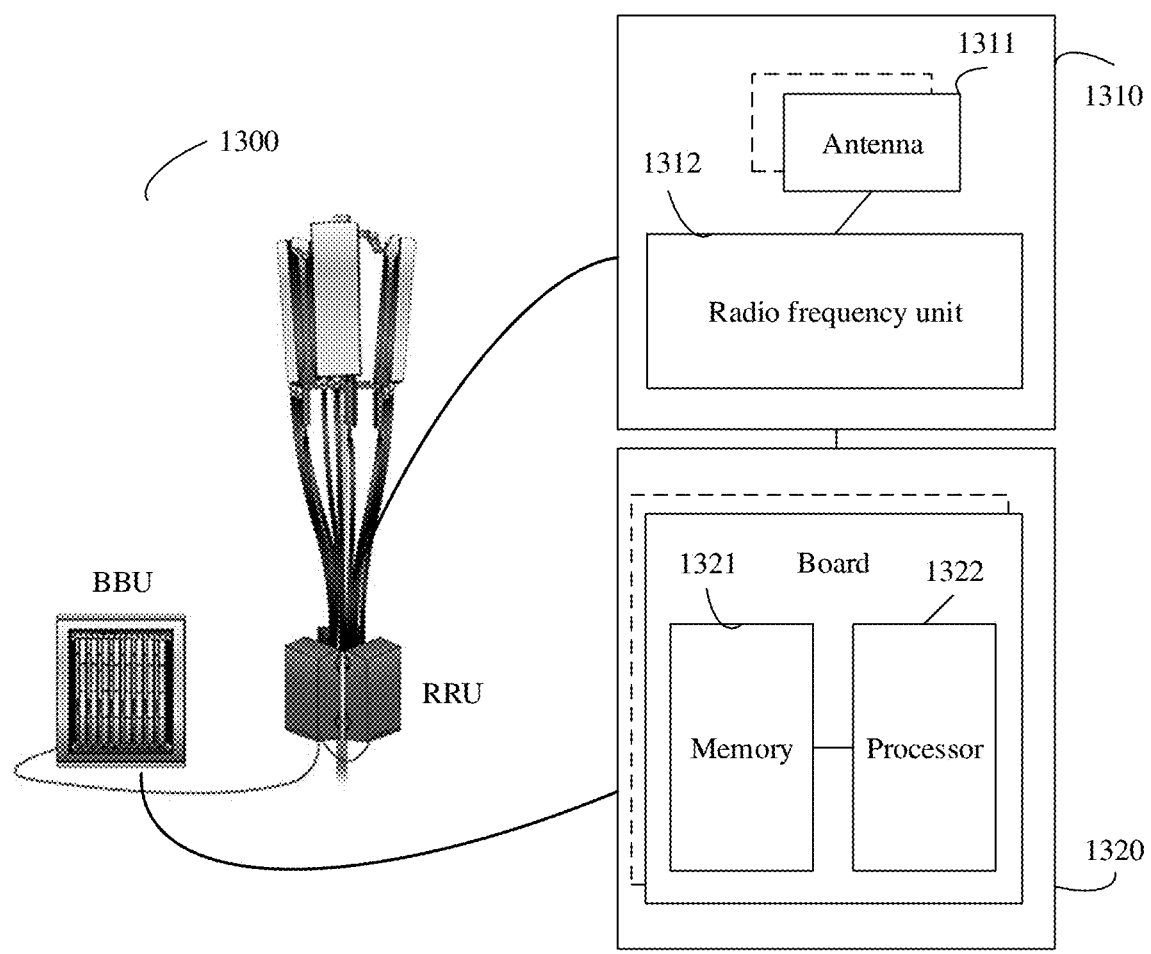
FIG. 13 is yet another schematic block diagram of a communication apparatus according to an embodiment of this application.

When the apparatus in this embodiment of this application is a network device, the apparatus may be shown in FIG. 13. The apparatus 1300 includes one or more radio frequency units such as a remote radio unit (RRU) 1310 and one or more baseband units (BBU) (which may also be referred to as a digital unit, digital unit, DU) 1320. The RRU 1310 may be referred to as a transceiver module. The transceiver module may include a sending module and a receiving module, or the transceiver module may be a module that can implement a sending function and a receiving function. Optionally, the transceiver module may also be referred to as a transceiver, a transceiver circuit, a transceiver, or the like, and may include at least one antenna 1311 and a radio frequency unit 1312. The RRU 1310 is mainly configured to send and receive a radio frequency signal, and perform conversion between the radio frequency signal and a baseband signal. For example, the RRU 1310 is configured to send indication information to a terminal device. The BBU 1310 is mainly configured to perform baseband processing, control a base station, and so on. The RRU 1310 and the BBU 1320 may be physically disposed together, or may be physically separated, that is, a distributed base station.

The BBU 1320 is a control center of the base station, may also be referred to as a processing module, and is mainly configured to implement baseband processing functions such as channel coding, multiplexing, modulation, and spectrum spreading. For example, the BBU 1320 may be configured to control the base station to perform an operation procedure related to the network device in the foregoing method embodiments, for example, generate the foregoing indication information.

In an example, the BBU 1320 may include one or more boards, and a plurality of boards may jointly support a radio access network (for example, an LTE network) having a single access standard, or may separately support radio access networks (for example, the LTE network, a 5G network, or another network) having different access standards. The BBU 1320 further includes a memory 1321 and a processor 1322. The memory 1321 is configured to store instructions and data that are necessary. The processor 1322 is configured to control the base station to perform a necessary action, for example, configured to control the base station to perform the operation procedure related to the network device in the foregoing method embodiments. The memory 1321 and the processor 1322 may serve one or more boards. In other words, a memory and a processor may be separately disposed on each board. Alternatively, the plurality of boards may share a same memory and processor. In addition, a necessary circuit may further be deployed on each board.

An embodiment of this application provides a communication system. The communication system may include the network device in the foregoing method embodiments and the terminal device in the foregoing method embodiments. The terminal device is, for example, the terminal device 800 in FIG. 8. The network device is, for example, the network device 900 in FIG. 9.

An embodiment of this application further provides a computer-readable storage medium. The computer-readable storage medium stores a computer program. When the computer program is executed by a computer, the computer may implement a procedure related to the terminal device in the foregoing method embodiments.

An embodiment of this application further provides a computer-readable storage medium. The computer-readable storage medium is configured to store a computer program. When the computer program is executed by a computer, the computer may implement a procedure related to the network device in the foregoing method embodiments.

An embodiment of this application further provides a computer program product. The computer program product is configured to store a computer program. When the computer program is executed by a computer, the computer may implement a procedure related to the terminal device in the foregoing method embodiments.

An embodiment of this application further provides a computer program product. The computer program product is configured to store a computer program. When the computer program is executed by a computer, the computer may implement a procedure related to the network device in the foregoing method embodiments.

It should be understood that the processor mentioned in embodiments of this application may be a CPU, or may be another general-purpose processor, a digital signal processor (DSP), an application specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should be further understood that the memory mentioned in embodiments of this application may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another appropriate type.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps can be implemented by electronic hardware or a combination of computer software and the electronic hardware. Whether the functions are performed by hardware or software depends on particular applications and design constraint conditions of the technical solutions. A person skilled in the art may use different methods to implement the functions for each particular application, but it should not be considered that the implementation goes beyond the scope of this application.

It may be clearly understood by a person skilled in the art that, for the purpose of convenient and brief description, for a detailed working process of the foregoing systems, apparatuses, and units, refer to a corresponding process in the foregoing method embodiments, and details are not described herein again.

In the several embodiments provided in this application, it should be understood that the disclosed systems, apparatuses, and methods may be implemented in other manners. For example, the foregoing apparatus embodiment is merely an example. For example, division into the units is merely logical function division and may be other division during actual implementation. For example, a plurality of units or components may be combined or integrated into another system, or some features may be ignored or may not be performed. In addition, the displayed or discussed mutual coupling or direct coupling or communication connection may be implemented by using some interfaces. The indirect coupling or communication connection between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in embodiments.

In addition, function units in embodiments of this application may be integrated into one processing unit, each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions in this application essentially, the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or a compact disc.

The foregoing descriptions are merely specific implementations of this application, but are not intended to limit the protection scope of embodiments of this application. Any variation or replacement readily figured out by a person skilled in the art within the technical scope disclosed in embodiments of this application shall fall within the protection scope of embodiments of this application. Therefore, the protection scope of embodiments of this application shall be subject to the protection scope of the claims.

What is claimed is:

1. A communication method, comprising:
   receiving a first synchronization signal/physical broadcast channel block located at a first frequency domain position;
   receiving a second synchronization signal/physical broadcast channel block located at a second frequency domain position, wherein the first synchronization signal/physical broadcast channel block and the second synchronization signal/physical broadcast channel block belong to a same synchronization signal/physical broadcast channel set;
   determining a second plurality of random access channel (RACH) occasions corresponding to the second frequency domain position;
   determining, in the second plurality of RACH occasions corresponding to the second frequency domain position, and based on a sending status of the synchronization signal/physical broadcast channel block located at the second frequency domain position, a RACH occasion of the second plurality of RACH occasions to which the second synchronization signal/physical broadcast channel block is mapped; and
   performing random access on the RACH occasion to which the second synchronization signal/physical broadcast channel block is mapped.

2. The method according to claim 1, wherein the method further comprises:
receiving a system information block type 1 (SIB 1) corresponding to the first synchronization signal/physical broadcast channel block, wherein the SIB 1 comprises indication information of a first plurality of RACH occasions corresponding to the first frequency domain position; and
wherein determining the second plurality of RACH occasions corresponding to the second frequency domain position comprises:
determining, based on the indication information of the first plurality of RACH occasions corresponding to the first frequency domain position, the second plurality of RACH occasions corresponding to the second frequency domain position.

3. The method according to claim 2, wherein determining, based on the indication information of the first plurality of RACH occasions corresponding to the first frequency domain position, the second plurality of RACH occasions corresponding to the second frequency domain position comprises:
determining, based on the indication information of the first plurality of RACH occasions corresponding to the first frequency domain position, based on an index of the first synchronization signal/physical broadcast channel block, and based on an index of the second synchronization signal/physical broadcast channel block, the second plurality of RACH occasions corresponding to the second frequency domain position.

4. The method according to claim 3, wherein the index of the first synchronization signal/physical broadcast channel block is an index of the first synchronization signal/physical broadcast channel block based on only a frequency domain sequence, and the index of the second synchronization signal/physical broadcast channel block is an index of the second synchronization signal/physical broadcast channel block based on only a frequency domain sequence; or
the index of the first synchronization signal/physical broadcast channel block is an index the first synchronization signal/physical broadcast channel block based on a frequency domain sequence and a time domain sequence, and the index of the second synchronization signal/physical broadcast channel block is an index of the second synchronization signal/physical broadcast channel block based on a frequency domain sequence and a time domain sequence.

5. The method according to claim 2, wherein the SIB 1 comprises an index of the first synchronization signal/physical broadcast channel block and an index of the second synchronization signal/physical broadcast channel block; or
the first synchronization signal/physical broadcast channel block comprises the index of the first synchronization signal/physical broadcast channel block, and the second synchronization signal/physical broadcast channel block comprises the index of the second synchronization signal/physical broadcast channel block.

6. The method according to claim 1, wherein the method further comprises:
receiving a system information block type 1 (SIB 1) corresponding to the first synchronization signal/physical broadcast channel block, wherein the SIB 1 comprises indication information of a first plurality of RACH occasions corresponding to the first frequency domain position:
wherein the indication information of the second plurality of RACH occasions corresponding to the second frequency domain position is comprised in at least one of the SIB 1 and the second synchronization signal/physical broadcast channel block; and
wherein determining the second plurality of RACH occasions corresponding to the second frequency domain position comprises determining, based on the indication information of the second plurality of RACH occasions corresponding to the second frequency domain position, the second plurality of RACH occasions corresponding to the second frequency domain position.

7. The method according to claim 1, wherein the method further comprises:
receiving a system information block type 1 (SIB 1) corresponding to the first synchronization signal/physical broadcast channel block, wherein the SIB 1 comprises indication information of a first plurality of RACH occasions corresponding to the first frequency domain position;
determining, based on the indication information of the first plurality of RACH occasions corresponding to the first frequency domain position, the first plurality of RACH occasions corresponding to the first frequency domain position;
determining, in the first plurality of RACH occasions corresponding to the first frequency domain position, and based on a sending status of a synchronization signal/physical broadcast channel block located at the first frequency domain position, a RACH occasion of the first plurality of RACH occasions to which the first synchronization signal/physical broadcast channel block is mapped;
performing random access on the RACH occasion of the first plurality of RACH occasions to which the first synchronization signal/physical broadcast channel block is mapped; and
receiving radio resource control (RRC) signaling or a physical downlink control channel (PDCCH), wherein the RRC signaling or the PDCCH comprises indication information of the second plurality of RACH occasions corresponding to the second frequency domain position;
wherein determining the second plurality of RACH occasions corresponding to the second frequency domain position comprises determining, based on the indication information of the second plurality of RACH occasions corresponding to the second frequency domain position, the second plurality of RACH occasions corresponding to the second frequency domain position.

8. A communication method, comprising:
sending a first synchronization signal/physical broadcast channel block located at a first frequency domain position;
sending a second synchronization signal/physical broadcast channel block located at a second frequency domain position, wherein the first synchronization signal/physical broadcast channel block and the second synchronization signal/physical broadcast channel block belong to a same synchronization signal/physical broadcast channel set;
determining, in a first plurality of random access channel (RACH) occasions corresponding to the first frequency domain position, and based on a sending status of a synchronization signal/physical broadcast channel block located at the first frequency domain position, a RACH occasion of the first plurality of RACH occasions to which the first synchronization signal/physical broadcast channel block is mapped; and determining, in a second plurality of RACH occasions corresponding to the second frequency domain position, and based on a sending status of a synchronization signal/physical broadcast channel block located at the second frequency domain position, a RACH occasion of the second plurality of RACH occasions to which the second synchronization signal/physical broadcast channel block is mapped.

9. The method according to claim 8, wherein the first synchronization signal/physical broadcast channel block comprises an index of the first synchronization signal/physical broadcast channel block, and the second synchronization signal/physical broadcast channel block comprises an index of the second synchronization signal/physical broadcast channel block; or the method further comprises:

sending a system information block type 1 (SIB 1) corresponding to the first synchronization signal/physical broadcast channel block, wherein the SIB 1 comprises indication information of the first plurality of RACH occasions corresponding to the first frequency domain position, an index of the first synchronization signal/physical broadcast channel block, and an index of the second synchronization signal/physical broadcast channel block.

10. The method according to claim 9, wherein the index of the first synchronization signal/physical broadcast channel block is an index of the first synchronization signal/physical broadcast channel block based on only a frequency domain sequence, and the index of the second synchronization signal/physical broadcast channel block is an index of the second synchronization signal/physical broadcast channel block based on only a frequency domain sequence; or the index of the first synchronization signal/physical broadcast channel block is an index the first synchronization signal/physical broadcast channel block based on a frequency domain sequence and a time domain sequence, and the index of the second synchronization signal/physical broadcast channel block is an index of the second synchronization signal/physical broadcast channel block based on a frequency domain sequence and a time domain sequence.

11. The method according to claim 8, wherein the method further comprises:

sending a system information block type 1 (SIB 1) corresponding to the first synchronization signal/physical broadcast channel block, wherein the SIB 1 comprises indication information of the first plurality of RACH occasions corresponding to the first frequency domain position, wherein indication information of the second plurality of RACH occasions corresponding to the second frequency domain position is comprised in at least one of the SIB 1 and the second synchronization signal/physical broadcast channel block.

12. The method according to claim 8, wherein the method further comprises:

sending a system information block type 1 (SIB 1) corresponding to the first synchronization signal/physical broadcast channel block, wherein the SIB 1 comprises indication information of the first plurality of RACH occasions corresponding to the first frequency domain position; and when a terminal device performs random access on a RACH occasion of the first plurality of RACH occasions to which the first synchronization signal/physical broadcast channel block is mapped, sending radio resource control (RRC) signaling or a physical downlink control channel (PDCCH) to the terminal device, wherein the RRC signaling or the PDCCH comprises indication information of the second plurality of RACH occasions corresponding to the second frequency domain position.

13. An apparatus, comprising:

one or more processors; and a non-transitory computer-readable storage medium storing a program to be executed by the one or more processors, the program including instructions to:

receive a first synchronization signal/physical broadcast channel block located at a first frequency domain position;

receive a second synchronization signal/physical broadcast channel block located at a second frequency domain position, wherein the first synchronization signal/physical broadcast channel block and the second synchronization signal/physical broadcast channel block belong to a same synchronization signal/physical broadcast channel set;

determine a second plurality of random access channel (RACH) occasions corresponding to the second frequency domain position;

determine, in the second plurality of RACH occasions corresponding to the second frequency domain position, and based on a sending status of a synchronization signal/physical broadcast channel block located at the second frequency domain position, a RACH occasion of the second plurality of RACH occasions to which the second synchronization signal/physical broadcast channel block is mapped; and perform random access on the RACH occasion of the second plurality of RACH occasions to which the second synchronization signal/physical broadcast channel block is mapped.

14. The apparatus according to claim 13, wherein executing the instructions further causes the apparatus to:

receive a system information block type 1 (SIB 1) corresponding to the first synchronization signal/physical broadcast channel block, wherein the SIB 1 comprises indication information of a first plurality of RACH occasions corresponding to the first frequency domain position;

wherein determining RACH occasions corresponding to the second frequency domain position comprises determining, based on the indication information of the first plurality of RACH occasions corresponding to the first frequency domain position, the second plurality of RACH occasions corresponding to the second frequency domain position.

15. The apparatus according to claim 14, wherein determining, based on the indication information of the first plurality of RACH occasions corresponding to the first frequency domain position, the second plurality of RACH occasions corresponding to the second frequency domain position comprises:

determining, based on the indication information of the first plurality of RACH occasions corresponding to the first frequency domain position, based on an index of the first synchronization signal/physical broadcast channel block, and based on an index of the second synchronization signal/physical broadcast channel block, the second plurality of RACH occasions corresponding to the second frequency domain position.

16. The apparatus according to claim 15, wherein the index of the first synchronization signal/physical broadcast channel block is an index of the first synchronization signal/physical broadcast channel block based on only a frequency domain sequence, and the index of the second synchronization signal/physical broadcast channel block is an index of the second synchronization signal/physical broadcast channel block based on only a frequency domain sequence; or the index of the first synchronization signal/physical broadcast channel block is an index the first synchronization signal/physical broadcast channel block based on a frequency domain sequence and a time domain sequence, and the index of the second synchronization signal/physical broadcast channel block is an index of the second synchronization signal/physical broadcast channel block based on a frequency domain sequence and a time domain sequence.

17. The apparatus according to claim 14, wherein the SIB 1 comprises an index of the first synchronization signal/physical broadcast channel block and an index of the second synchronization signal/physical broadcast channel block; or wherein the index of the first synchronization signal/physical broadcast channel block is comprised in the first synchronization signal/physical broadcast channel block, and the index of the second synchronization signal/physical broadcast channel block is comprised in the second synchronization signal/physical broadcast channel block.

18. The apparatus according to claim 13, wherein the instructions further include instructions to:

receive a SIB 1 corresponding to the first synchronization signal/physical broadcast channel block, wherein the SIB 1 comprises indication information of RACH occasions corresponding to the first frequency domain position, wherein indication information of the second plurality of RACH occasions corresponding to the second frequency domain position is included in at least one of the SIB 1 and the second synchronization signal/physical broadcast channel block; and the determining RACH occasions corresponding to the second frequency domain position comprises determining, based on the indication information of the second plurality of RACH occasions corresponding to the second frequency domain position, the second plurality of RACH occasions corresponding to the second frequency domain position.

19. The apparatus according to claim 13, wherein the instructions further include instructions to:

receive a system information block type 1 (SIB 1) corresponding to the first synchronization signal/physical broadcast channel block, wherein the SIB 1 comprises indication information of a first plurality of RACH occasions corresponding to the first frequency domain position;

determine, based on the indication information of the first plurality of RACH occasions corresponding to the first frequency domain position, the first plurality of RACH occasions corresponding to the first frequency domain position;

determine, in the first plurality of RACH occasions corresponding to the first frequency domain position, and based on a sending status of a synchronization signal/physical broadcast channel block located at the first frequency domain position, a RACH occasion of the first plurality of RACH occasions to which the first synchronization signal/physical broadcast channel block is mapped;

perform random access on the RACH occasion to which the first synchronization signal/physical broadcast channel block is mapped; and receive radio resource control (RRC) signaling or a physical downlink control channel (PDCCH), wherein the RRC signaling or the PDCCH comprises indication information of the second plurality of RACH occasions corresponding to the second frequency domain position;

wherein determining second plurality of RACH occasions corresponding to the second frequency domain position comprises determining, based on the indication information of the second plurality of RACH occasions corresponding to the second frequency domain position, the second plurality of RACH occasions corresponding to the second frequency domain position.

* * * * *